United States Patent
Lee et al.

(10) Patent No.: US 10,514,679 B2
(45) Date of Patent: Dec. 24, 2019

(54) METHOD OF SLICING AND PRINTING COLOUR 3D MODEL

(71) Applicants: XYZPRINTING, INC., New Taipei (TW); KINPO ELECTRONICS, INC., New Taipei (TW)

(72) Inventors: Yang-Teh Lee, New Taipei (TW); Jia-Yi Juang, New Taipei (TW); Chun-Hsiang Huang, New Taipei (TW); Ming-En Ho, New Taipei (TW); Yu-Chuan Chang, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 343 days.

(21) Appl. No.: 15/452,705

(22) Filed: Mar. 7, 2017

(65) Prior Publication Data

US 2018/0196407 A1    Jul. 12, 2018

(30) Foreign Application Priority Data

Jan. 6, 2017   (TW) .............................. 106100412 A

(51) Int. Cl.
*G05B 19/4099*    (2006.01)
*B29C 67/00*      (2017.01)
*B41J 2/01*       (2006.01)
*B33Y 10/00*      (2015.01)
*B33Y 50/02*      (2015.01)
(Continued)

(52) U.S. Cl.
CPC ...... *G05B 19/4099* (2013.01); *B29C 67/0007* (2013.01); *B41J 2/01* (2013.01); *B29K 2055/02* (2013.01); *B29K 2067/046* (2013.01); *B33Y 10/00* (2014.12); *B33Y 50/02* (2014.12);
(Continued)

(58) Field of Classification Search
CPC ......... B33Y 10/00; B33Y 40/00; B33Y 50/00; B33Y 99/00; G05B 19/4099
See application file for complete search history.

(56) References Cited

U.S. PATENT DOCUMENTS

2015/0239174 A1* 8/2015 Chen ..................... B33Y 10/00
                                                    264/129
2016/0001505 A1* 1/2016 Hakkaku ................ B41J 3/4073
                                                    264/255

FOREIGN PATENT DOCUMENTS

EP     2455211 A2      5/2012
WO     2015163776 A1   10/2015
WO     2016003277 A1   1/2016

OTHER PUBLICATIONS

Search Report dated Oct. 13, 2017 of the corresponding European patent application No. 17161158.5.

* cited by examiner

*Primary Examiner* — Austin Murata
(74) *Attorney, Agent, or Firm* — Chun-Ming Shih; HDLS IPR Services

(57) ABSTRACT

A method of slicing and printing a colour 3D model is disclosed. The method includes following steps: loading a model data corresponding to a colour 3D model; adding a pollution-blocking structure next to the colour 3D model; executing a slicing process to the pollution-blocking structure and the colour 3D model for generating a plurality of pollution-blocking slices and a plurality of model slices and configuring colour of each of the model slices; and, controlling a modeling nozzle (100) of a multi-colour 3D printer (1) to print the pollution-blocking slices and the model slices layer by layer and controlling a coloring nozzle (102) of the multi-colour 3D printer (1) to color each of the model slices.

17 Claims, 23 Drawing Sheets

(51) Int. Cl.
 *B33Y 70/00* (2015.01)
 *B29K 55/02* (2006.01)
 *B29K 67/00* (2006.01)
(52) U.S. Cl.
 CPC ..... *B33Y 70/00* (2014.12); *G05B 2219/35134* (2013.01); *G05B 2219/49007* (2013.01)

METHOD OF SLICING AND PRINTING COLOUR 3D MODEL

BACKGROUND OF THE INVENTION

Field of the Invention

The technical field relates to a colour 3D model, especially to a method of slicing and printing a colour 3D model.

Description of Prior Art

Due to the need of printing multi-colour 3D entity model, a multi-colour 3D printer using fused deposition modeling (FDM) has been provided in related art. The aforementioned multi-colour 3D printer is also equipped with a modeling nozzle for performing 3D printing and a coloring nozzle for coloring.

Please also refer to FIGS. 1A-1D, FIG. 1A shows a diagram of a first printing operation of the related-art multi-colour 3D printer, FIG. 1B shows a diagram of a second printing operation of the related-art multi-colour 3D printer, FIG. 1C a shows a diagram of a third printing operation of the related-art multi-colour 3D printer, FIG. 1D shows a diagram of a fourth printing operation of the related-art multi-colour 3D printer, for description of performing multi-colour 3D print by the related-art multi-colour 3D printer.

After starting to print, the multi-colour 3D printer first controls a modeling nozzle 10 to print a layer of model slice 140 (as shown in FIG. 1A), and controls a coloring nozzle 12 to spout colour ink (for example, black ink) on the model slice 140 to perform coloring (as shown in FIG. 1B). Then the multi-colour 3D printer controls the modeling nozzle 10 to stack and print another layer of model slice 142 on the model slice 140 already printed (as shown in FIG. 1C), and controls the coloring nozzle 12 to spout ink of different colour (for example, blue ink) on the model slice 14 to perform coloring (as shown in FIG. 1D). The multi-colour 3D printer can generate a multi-colour 3D entity model by repeating the operations of printing and coloring mentioned above.

In the aforementioned print method, due to the limitation in the spouting accuracy of the coloring nozzle 12, the ink tends to splash to a location outside the intended area (such as an outer wall of other model slice 140) when the multi-colour 3D printer colors the model slice 142. This results in color-mixing defect in the generated multi-colour 3D entity model, and the print quality is reduced.

SUMMARY OF THE INVENTION

The disclosure is directed to provides a method of slicing and printing a colour 3D model, the method automatically adds a pollution-blocking structure to shield ink splashed out of a print range during a coloring process.

The present disclosure discloses a method of slicing and printing a colour 3D model, the method includes:

a) loading a model data corresponding to a colour 3D model and reading a shape data and a colour data of the model data;

b) generating a pollution-blocking structure data corresponding to a pollution-blocking structure surrounding a color area of the colour 3D model or surrounded by the color area, and configuring the pollution-blocking structure data to make the pollution-blocking structure corresponding be close to but not in contact with the colour 3D model;

c) executing a slicing process to generate a plurality of pollution-blocking slice data corresponding to a plurality of pollution-blocking slices respectively according to the pollution-blocking structure data, to generate a plurality of model slice data corresponding to a plurality of model slices respectively according to the shape data, and to generate a plurality of coloring data according to the colour data, wherein each pollution-blocking slice data, each of the model slice data and each of the coloring data record a mark of layer number respectively; and d) controlling a modeling nozzle of a multi-colour 3D printer to print the plurality of pollution-blocking slices and the plurality of model slices layer by layer according to the plurality of pollution-blocking slice data and the plurality of model slice data, and controlling a coloring nozzle of the multi-colour 3D printer to color the model slice printed according to the coloring data with the same layer number, when the pollution-blocking slices and the model slices with the same layer number are printed completely, to make the pollution-blocking structure printed be close to but not in contact with the colour 3D model printed.

The present disclosure can effectively prevent the ink from being splashed to other model slice already printed to make color-mixing, and thus effectively improve print quality.

BRIEF DESCRIPTION OF DRAWING

One or more exemplary embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

Figure 1A:
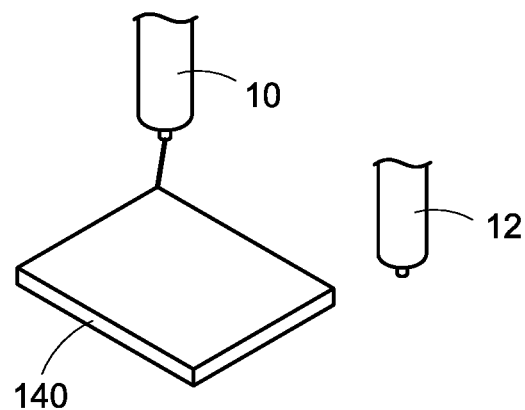
FIG. 1A shows a diagram of a first print of the multi-colour 3D printer of prior art.
Figure 1B:
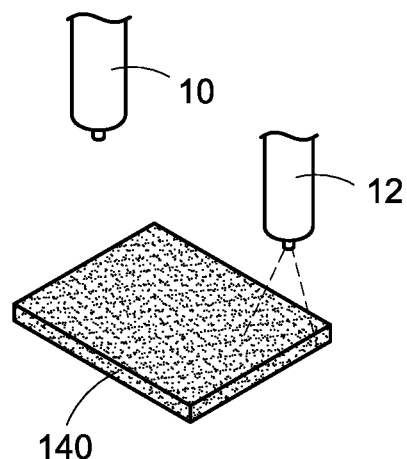
FIG. 1B shows a diagram of a second print of the multi-colour 3D printer of prior art.
Figure 1C:
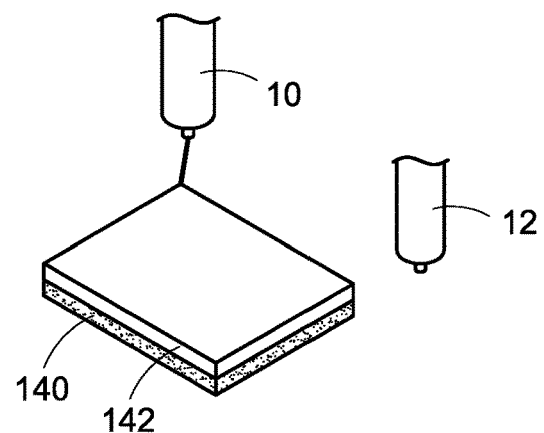
FIG. 1C shows a diagram of a third print of the multi-colour 3D printer of prior art.
Figure 1D:
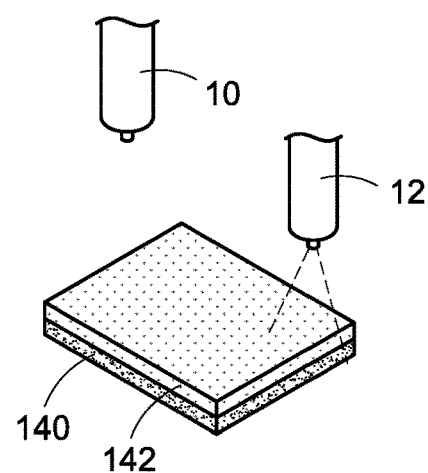
FIG. 1D shows a diagram of a fourth print of the multi-colour 3D printer of prior art.
Figure 2:
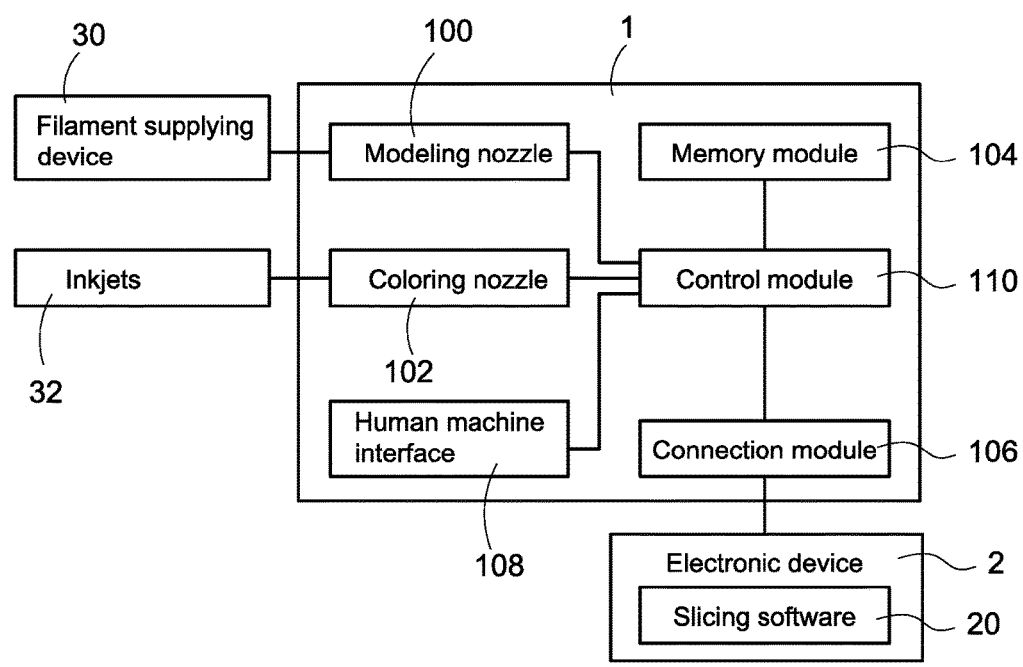
FIG. 2 shows a structural diagram of a multi-colour 3D printer according to a first exemplary embodiment of the present disclosure.

Please refer to FIG. 2 first, FIG. 2 shows a schematic diagram of a multi-colour 3D printer according to a first exemplary embodiment of the present disclosure. The exemplary embodiment discloses a 3D print system, including a multi-colour 3D printer 1 and a slicing software 20. After the slicing software 20 is executed by an electronic device 2 (such as desktop computer, laptop, cloud server, or smartphone), a model data corresponding to colour 3D model can be loaded, the multi-colour 3D model is processed by modifying the model data, and a 3D print data (the following pollution-blocking slice data, model slice data or coloring data, the 3D print data can be expressed as G-code) is generated. The multi-colour 3D printer 1 can perform printing according to the 3D print data, in order to generate a multi-colour 3D entity model corresponding to the multi-colour 3D model.

The multi-colour 3D printer 1 mainly includes a modeling nozzle 100, a coloring nozzle 102, a memory module 104, a connection module 106, a human machine interface 108 and a control module 110.

The modeling nozzle 100 is connected to a filament supplying device 30, and capable of using filament to perform 3D print.

In an exemplary embodiment, the multi-colour 3D printer 1 is a fused deposition modeling (FDM) 3D printer, the filament supplying device 30 can provide thermoplastic filaments (for example, ABS or PLA) to the modeling nozzle 100, the modeling nozzle 100 can heat filament to half-molten state to perform 3D print.

In an exemplary embodiment, the multi-colour 3D printer 1 is a stereo-lithography (SL) 3D printer, the filament supplying device 30 can provide liquid UV curable resin to the modeling nozzle 100, the modeling nozzle 100 can spout a photosensitive resin and apply light (ultraviolet light or laser light) to the spouted photosensitive resin to cure the photosensitive resin to perform 3D print.

The coloring nozzle 102 is connected to an inkjet 32 storing ink. In an exemplary embodiment, the coloring nozzle 102 can include a plurality of sub nozzles, each sub nozzle is respectively connected to one of a plurality of inkjets 32 of different colors (such as cyan, magenta, yellow and black), and full-color print can be realized by color-mixing.

The memory module 104 is used for storing data, such as the 3D print data aforementioned. The connection module 106 (for example, USB module, PCI bus module, Wi-Fi module or Bluetooth module) is connected to the electronic device 2, and used for receiving the 3D print data from the electronic device 2. The human machine interface 108 (for example: button, display, indicating light, buzzer or any combination of all above) is used for receiving user operation and outputting printing-related information.

The control module 110 can control the modeling nozzle 100 and the coloring nozzle 102 to print according to the 3D print data.

Figure 3:
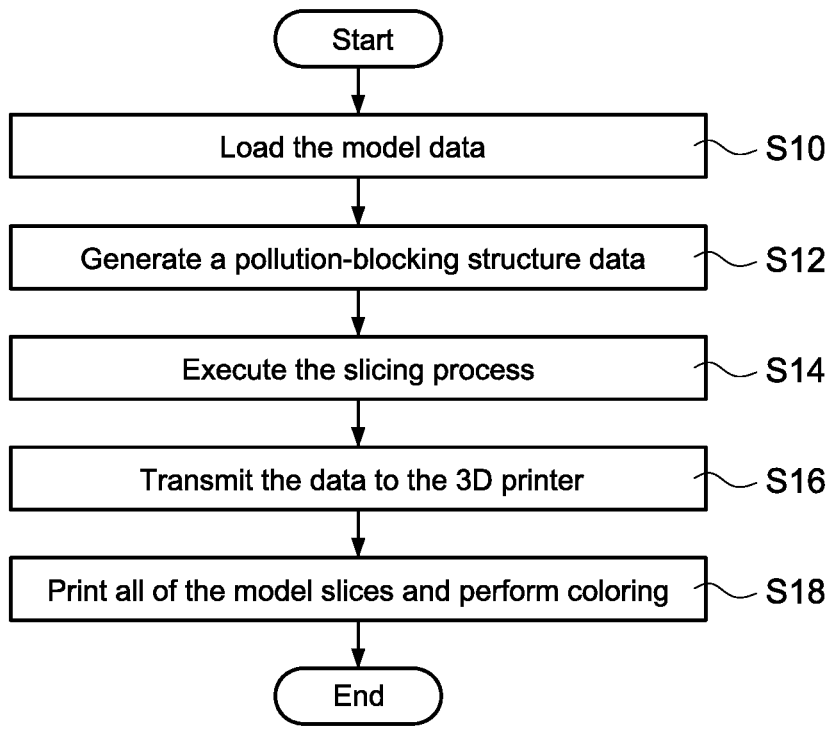
FIG. 3 shows a flowchart of a slicing and printing method according to the first exemplary embodiment of the present disclosure.
Figure 4A:
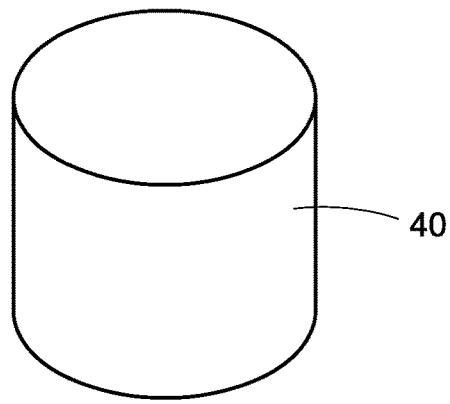
FIG. 4A shows a diagram of a first colour 3D model.
Figure 4B:
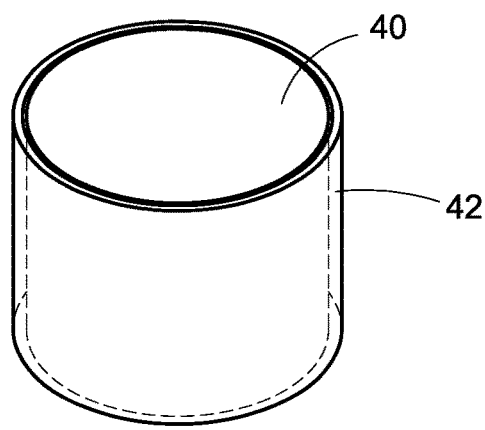
FIG. 4B shows a diagram of an external pollution-blocking structure added.
Figure 4C:
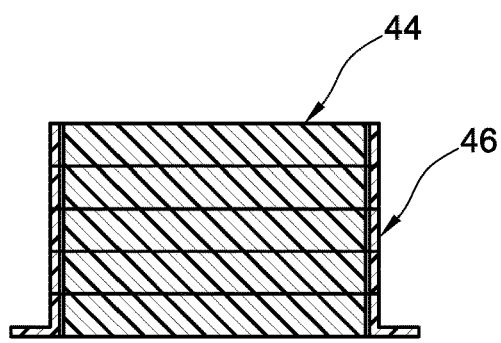
FIG. 4C shows a sectional view of a result of a slicing process in FIG. 4B.
Figure 5:
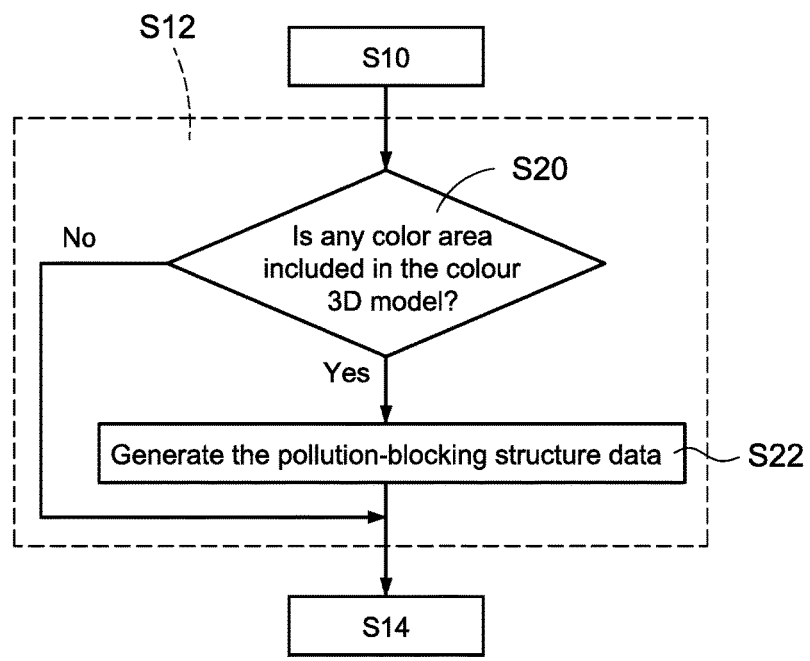
FIG. 5 shows a flowchart of part of the slicing and printing method according to the second exemplary embodiment of the present disclosure.

Please also refer to FIG. 3 and FIGS. 4A-4C, FIG. 3 shows a flowchart of a slicing and printing method according to the first exemplary embodiment of the present disclosure. FIG. 4A shows a diagram of a first colour 3D model. FIG. 4B shows a diagram of an external pollution-blocking structure added. FIG. 4C shows a sectional view of a result of a slicing process in FIG. 4B. The slicing and printing method of the colour 3D model according to each exemplary embodiment of the present disclosure, is mainly implemented by the print system 1 shown in FIG. 2. In the exemplary embodiment of FIG. 3, the slicing and printing method includes the following steps.

After the slicing software 20 is executed by the electronic device 2, the slicing software 20 can control the electronic device 2 to execute steps S10-S16.

Step S10: The electronic device 2 loads the model data corresponding to colour 3D model (such as the colour 3D model 40 shown in FIG. 4A). Furthermore, the electronic device 2 reads a shape data and a colour data of the model data, the shape data corresponds to a shape of each part of the colour 3D model, the colour data corresponds to a color of each part of the colour 3D model.

Step S12: The electronic device 2 generates a pollution-blocking structure data corresponding to the pollution-blocking structure. The pollution-blocking structure surrounds the colour 3D model, and is close to but not in contact with the colour 3D model.

In an exemplary embodiment, the electronic device 2 generates the pollution-blocking structure data corresponding to external pollution-blocking structure, thus adding an external pollution-blocking structure surrounding or partly surrounding an outer wall of a colour area (described later in the following) of the colour 3D model loaded. Furthermore, the electronic device 2 configures the pollution-blocking structure data to make the external pollution-blocking structure be close to but not in contact with the outer wall of the colour area. That is, the external pollution-blocking structure is separated from the outer wall of the colour area with a predetermined spacing (for example, 0.1 cm).

For example, as shown in FIG. 4B, the electronic device 2 can generate the external pollution-blocking structure 42, and make the external pollution-blocking structure 42 surround the colour 3D model 40, and make the external pollution-blocking structure 42 and the colour 3D model 40 be separated from each other with a predetermined external spacing (for example, 0.1 mm). A thickness of a blocking wall part of the external pollution-blocking structure 42 matches a predetermined external thickness (for example, 0.3 mm).

Figure 13A:
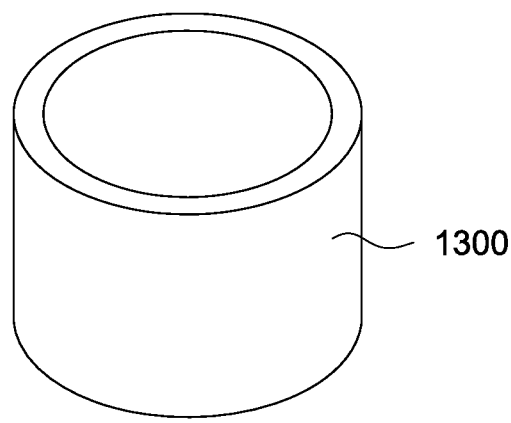
FIG. 13A shows a diagram of a third colour 3D model.
Figure 13B:
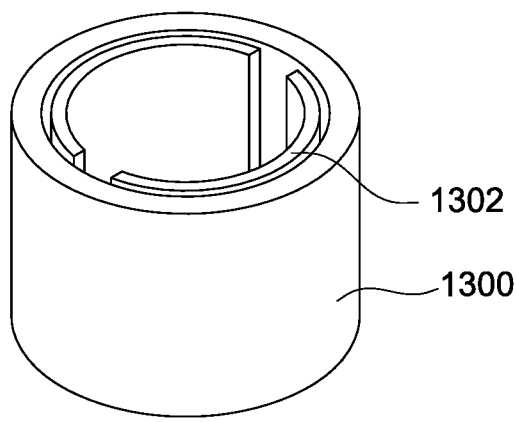
FIG. 13B shows a diagram of an internal pollution-blocking structure added.

In another exemplary embodiment, the electronic device 2 generates a pollution-blocking structure data corresponding to an internal pollution-blocking structure, thus adding an internal pollution-blocking structure (such as the internal pollution-blocking structure 1302 shown in FIG. 13B) surrounded or partly surrounded by an inner wall of a colour area of the colour 3D model loaded. The electronic device 2 configures the pollution-blocking structure data to make the internal pollution-blocking structure be close to but not in contact with the inner wall of the color area. That is, the internal pollution-blocking structure is separated from the inner wall of the colour area with a predetermined spacing (for example, 0.1 cm), but not limited.

Step S14: The electronic device 2 executes the slicing process to generate a plurality of pollution-blocking slice data corresponding to a plurality of pollution-blocking slices respectively according to the pollution-blocking structure data, to generate a plurality of model slice data corresponding to a plurality of model slices respectively according to the shape data, and to generate a plurality of coloring data respectively corresponding to the plurality of model slice data according to the colour data.

In the slicing process, the electronic device 2 can slice the external pollution-blocking structure to the plurality of external pollution-blocking slices (such as the external pollution-blocking slices 46 shown in FIG. 4C), and slice the colour 3D model to the plurality of model slices (such as the model slices 44 shown in FIG. 4C), and configure the colour of each model slice.

In an exemplary embodiment, each pollution-blocking slice data, each model slice data and each coloring data respectively records a mark of layer number, the mark of layer number is used for marking a number of layers correspond to each pollution-blocking slice data, each model slice data or each coloring data.

Step S16: The electronic device 2 transmits the 3D print data generated (all of the pollution-blocking slice data, model slice data and coloring data) to the multi-colour 3D printer 1.

Then the control module 110 of the multi-colour 3D printer 1 receives the 3D print data through the connection module 106, and then performs step S18: the control module 110 controls the modeling nozzle 100 (according to all of the pollution-blocking slice data and the marks of layer numbers) to print all of the external pollution-blocking slices layer by layer to generate an external pollution-blocking entity model, controls the modeling nozzle 100 (according to all of the model slice data and the marks of layer numbers) to print all of the model slices layer by layer, and controls the coloring nozzle 102 (according to all of the coloring data and the marks of layer numbers) to perform coloring to generate the colour 3D entity model.

Specifically, during the print process, the control module 110 (according to the coloring data of the same layer) controls the coloring nozzle 102 to color the model slices already printed, after the external pollution-blocking slices and the model slices of the same layer are printed completely.

It should be noted that, during the color process, because the pollution-blocking slices printed (the external pollution-blocking slice and/or the internal pollution-blocking slice) surround and are close to the model slices already printed, the ink splashes to a location outside the intended area (splashes to a location outside top cross-section of the model slices printed) is blocked by the pollution-blocking slices printed, and the ink does not splash to outer wall or inner wall of other model slices printed.

Using each exemplary embodiment of the present disclosure for printing, the ink can be effectively prevented from splashing to other model slices printed to cause color-mixing, thus effectively improving the print quality.

Figure 6A:
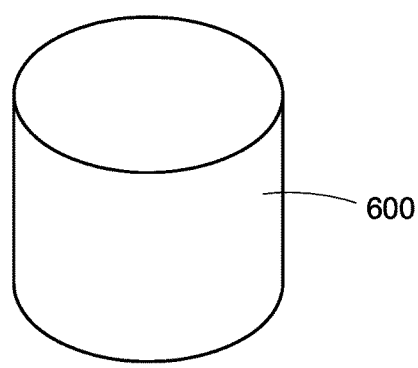
FIG. 6A shows a diagram of a 3D model not to be colored.
Figure 6B:
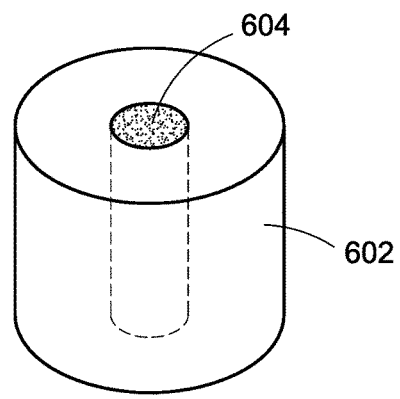
FIG. 6B shows a diagram of a 3D model colored at central.
Figure 6C:
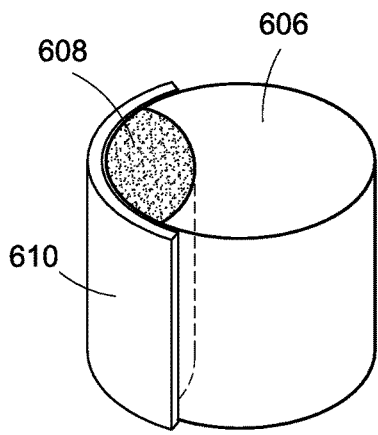
FIG. 6C shows a diagram of a 3D model diagram colored in a single area.
Figure 6D:
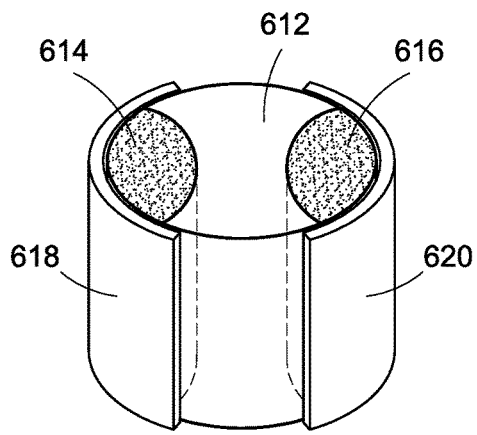
FIG. 6D shows a diagram of a 3D model diagram colored in multi-areas.

Please also refer to FIG. 5 and FIGS. 6A-6D, FIG. 5 shows a flowchart of part of the slicing and printing method according to the second exemplary embodiment of the present disclosure, FIG. 6A shows a diagram of a 3D model not to be colored, FIG. 6B shows a diagram of a 3D model colored at central, FIG. 6C shows a diagram of a 3D model diagram colored in a single area, FIG. 6D shows a diagram of a 3D model diagram colored in multi-areas. The exemplary embodiment in FIG. 5 generates the pollution-blocking structure data corresponding to the external pollution-blocking structure for description. Compared with the exemplary embodiment in FIG. 3, the slicing and printing method of the exemplary embodiment in FIG. 5 has step S12 including the following steps.

Step S20: The electronic device 2 determines if the colour 3D model includes any color area.

If the electronic device 2 identifies any color area in the colour 3D model, then step S22 is executed to generate the pollution-blocking structure data to add an external pollution-blocking structure. Otherwise, the electronic device 2 executes step S14.

For example, if the colour 3D model does not include any color area (as shown in FIG. 6A, the colour 3D model 600 does not include any color area, that is, the colour 3D model is to be printed without coloring), or if the colour 3D model includes the color area, but the color area is not located on an edge (as shown in FIG. 6B, the color area 604 is located at a center of the colour 3D model 602, that is, the colour 3D model 602 is printed without the ink splashing to the outer wall), the electronic device 2 can determine that it is not needed to add the external pollution-blocking structure (without executing step S22), and step S14 is then executed.

Step S22: the electronic device 2 generates the pollution-blocking structure data corresponding to the external pollution-blocking structure to add the external pollution-blocking structure, and make the external pollution-blocking structure surround the outer wall of the color area recognized, thus shielding the ink splashing to the outer wall during coloring and thus preventing unexpected color-mixing or coloring.

For example, as shown in FIG. 6C, if the colour 3D model 606 only includes a single color area 608, the electronic device 2 can only add a set of external pollution-blocking structure 610, and the external pollution-blocking structure 610 only surrounds the color area 608, namely, all outer wall of the colour 3D model 606 is not surrounded.

In another example, as shown in FIG. 6D, if the colour 3D model 612 includes a plurality of color area 614, 616, the electronic device 2 can respectively add the external pollution-blocking structure 618, 620 for each color area 614, 616.

The present disclosure can effectively decrease a total volume of the added external pollution-blocking structure by adding external pollution-blocking structure only for the color area, and further decrease the filament used for printing the external pollution-blocking structure.

In an exemplary embodiment, a range that the external pollution-blocking structure surrounds can be a little larger than that of the color area. In this way, an effect of the pollution-blocking can be further improved.

Figure 7:
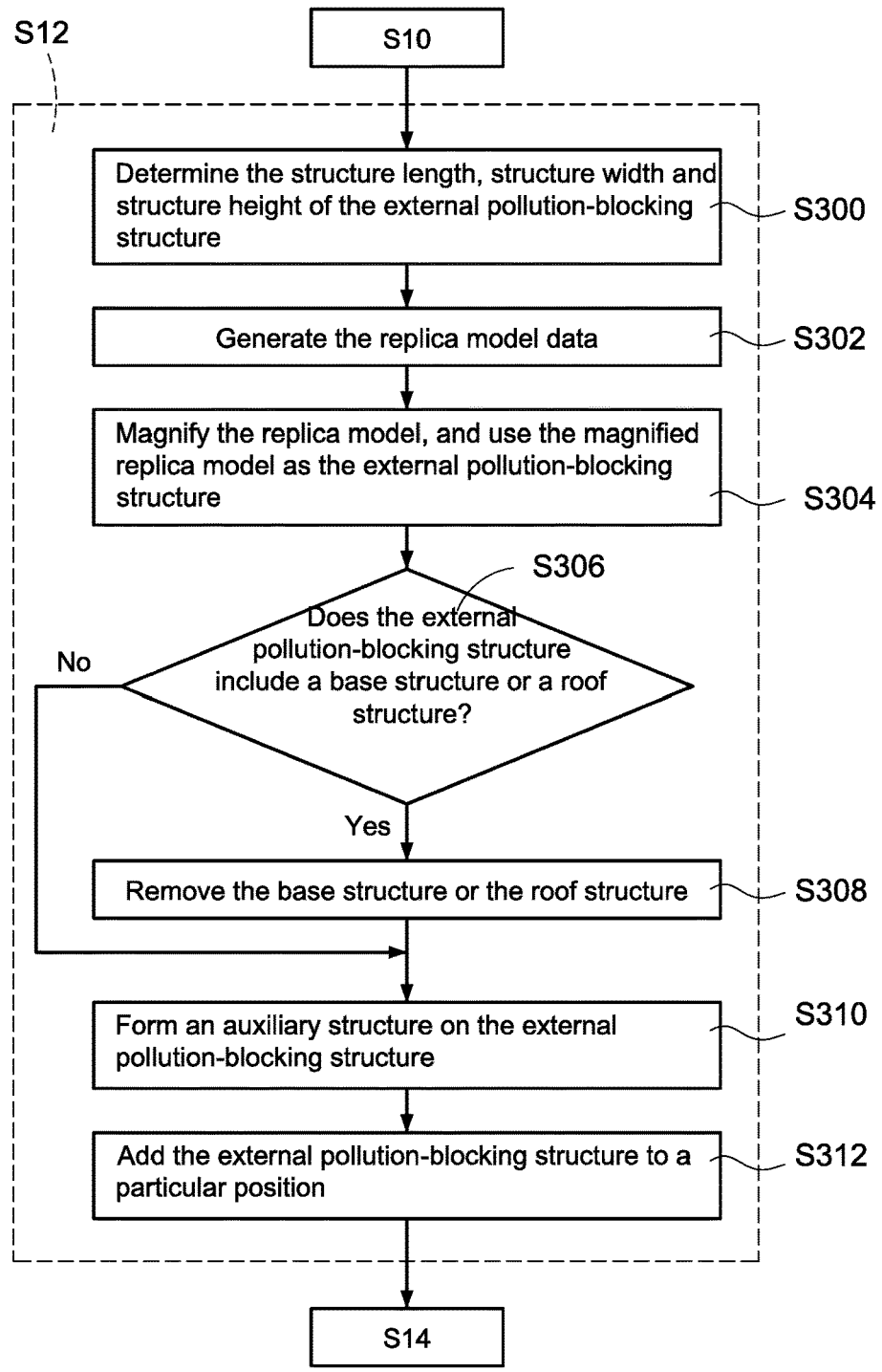
FIG. 7 shows a flowchart of part of the slicing and printing method according to the third exemplary embodiment of the present disclosure.
Figure 8A:
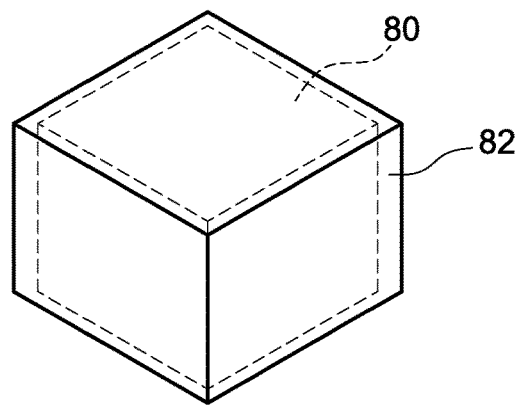
FIG. 8A shows a diagram of a second colour 3D model and a replica model magnified.
Figure 8B:
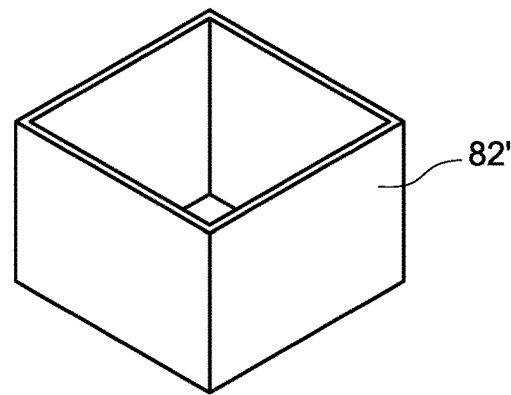
FIG. 8B shows a diagram of an external pollution-blocking structure with a base structure and a roof structure removed.
Figure 8C:
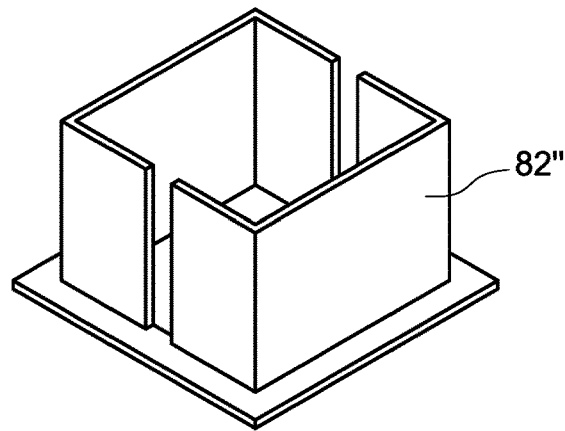
FIG. 8C shows a diagram of an external pollution-blocking structure with an auxiliary structure added.

Please also refer to FIG. 7 and FIGS. 8A-8C, FIG. 7 shows a flowchart of part of the slicing and printing method according to the third exemplary embodiment of the present disclosure, FIG. 8A shows a diagram of a second colour 3D model and a replica model magnified, FIG. 8B shows a diagram of an external pollution-blocking structure with a base structure removed and a roof structure removed, FIG. 8C shows a diagram of an external pollution-blocking structure with an auxiliary structure added. The exemplary embodiment in FIG. 7 generates the pollution-blocking structure data corresponding to the external pollution-blocking structure for description. In the exemplary embodiment of FIG. 7, the external pollution-blocking structure is generated by modifying a replica model of the colour 3D model.

Compared to the exemplary embodiment shown in FIG. 3, the slicing and printing method of the exemplary embodiment of FIG. 7 includes step S12 including the following steps.

Step S300: the electronic device 2 obtains a predetermined external spacing and an external thickness. Then the electronic device 2 determines the structure length, structure width and structure height of the external pollution-blocking structure to be generated according to external spacing, external thickness, the model length, model width and model height of shape data respectively. The model length, model width and model width of the aforementioned shape data correspond to the model length (length in X axis), model width (length in Y axis) and model height (length in Z axis) of the colour 3D model (such as the colour 3D model 80 shown in FIG. 8A).

In an exemplary embodiment, the electronic device 2 calculates the structure length, structure width and structure height according to the following equations (1)-(3):

$$\text{structure length}=(\text{model length}+\text{external spacing}\times 2) \quad (1)$$

$$\text{structure width}=(\text{model width}+\text{external spacing}\times 2) \quad (2)$$

$$\text{structure height}=\text{model height} \quad (3)$$

In an exemplary embodiment, a user can adjust the external spacing and external thickness according to an ink-jet aperture of the coloring nozzle 102, thus optimizing an effect of the pollution-blocking.

Step S302: the electronic device 2 generates the replica model data corresponding to the replica model of the colour 3D model. In an exemplary embodiment, both the shape and size of the replica model corresponding to the replica model data equal to the colour 3D model corresponding to the model data and are not to be colored.

In an exemplary embodiment, the electronic device 2 also executes a hollowing process to the replica model by modifying the replica model data, to make replica model internal be hollow and make a thickness of the part of blocking wall match that of the external one.

Step S304: the electronic device 2 magnifies the generated replica model by modifying the replica model data, to make the length, width and height of the replica model match the determined structure length, structure width and structure height (as the magnified replica model 82 shown in FIG. 8A), and uses the magnified replica model as the external pollution-blocking structure, that is, using the modified replica model data as the aforementioned pollution-blocking structure data.

Step S306: the electronic device 2 determines if the external pollution-blocking structure includes a base structure or a roof structure. If the electronic device 2 determines that the external pollution-blocking structure includes the base structure or the roof structure, the electronic device 2 performs a step S308. Otherwise, the electronic device 2 performs step S310.

Step S308: the electronic device 2 removes the base structure or the roof structure of the external pollution-blocking structure by modifying the replica model data, to make the external pollution-blocking structure be an open shell (namely, the internal space communicating with the external space of the external pollution-blocking structure 82' as shown in FIG. 8B).

Step S310: the electronic device 2 modifies the external pollution-blocking structure to form an auxiliary structure on the external pollution-blocking structure. In an exemplary embodiment, the aforementioned auxiliary structure can be a demolition structure (for example, a notch) or a support outer edge (as the external pollution-blocking structure 82" shown in FIG. 8C, including the support outer edge and two adjacent notches).

In the present disclosure, a support outer edge is located on the external pollution-blocking structure, additional support force can be provided to the external pollution-blocking structure. The pollution-blocking function can keep working even when the external pollution-blocking structure is collapsed or tilted during printing, to prevent the pollution-blocking structure from adhering to the colour 3D model during printing to ensure the successful printing.

The electronic device 2 then executes step S312: the electronic device 2 adds the external pollution-blocking structure to a particular position of the colour 3D model by modifying the pollution-blocking structure data. In an exemplary embodiment, the electronic device 2 adds the external pollution-blocking structure to the position surrounding the colour 3D model and separated from the colour 3D model with the aforementioned external spacing. Then step S14 is executed.

Figure 9A:
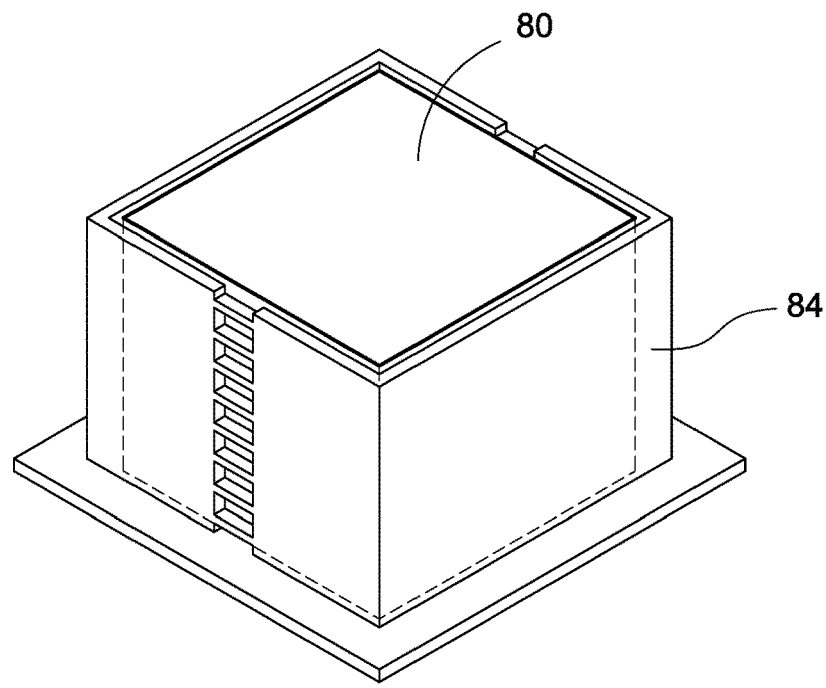
FIG. 9A shows a diagram of a first notch.
Figure 9B:
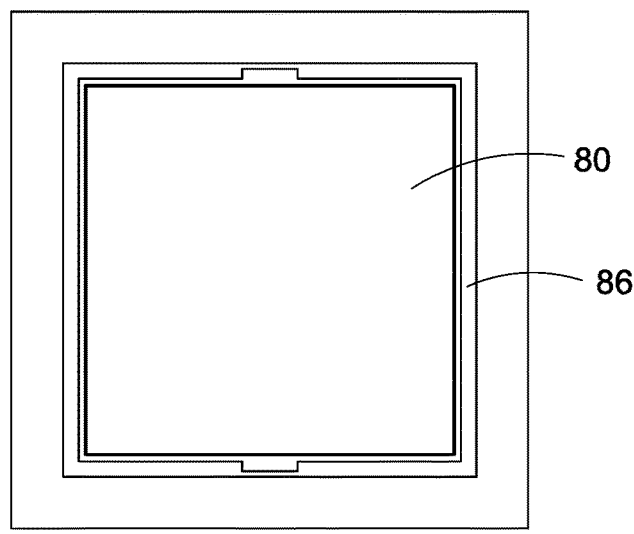
FIG. 9B shows a diagram of a second notch.
Figure 9C:
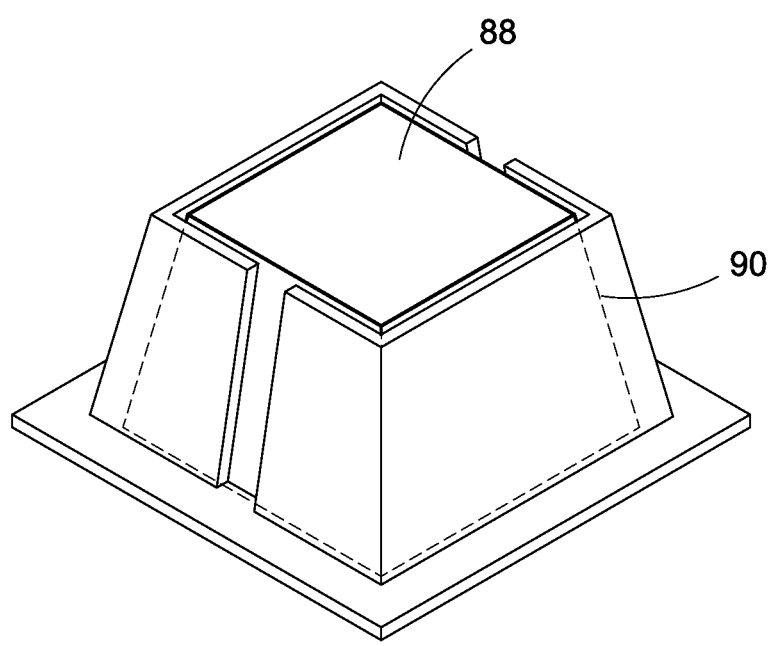
FIG. 9C shows a diagram of a third notch.
Figure 10:
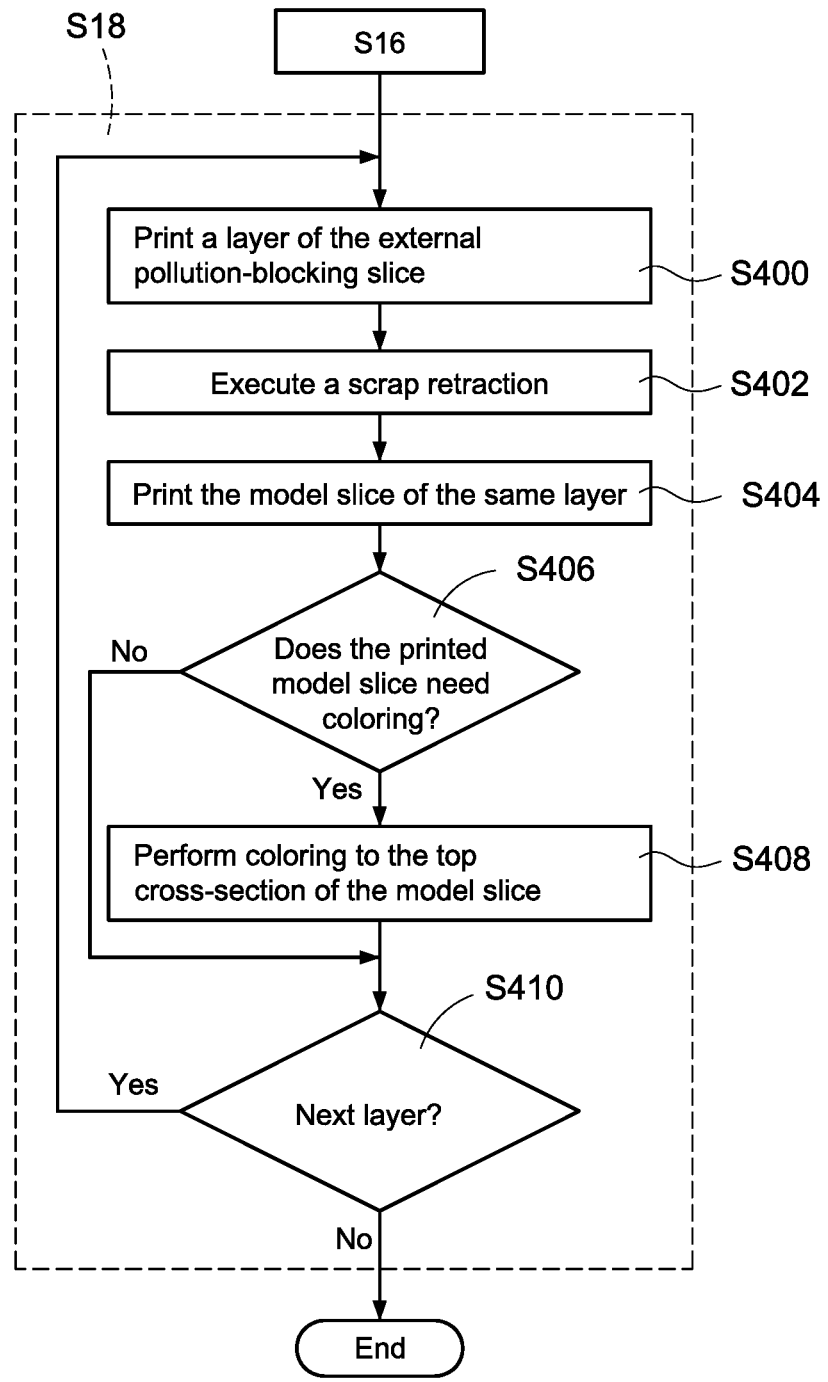
FIG. 10 shows a flowchart of part of the slicing and printing method according to the fourth exemplary embodiment of the present disclosure.

Please also refer to FIGS. 9A-9C, FIG. 9A shows a diagram of a first notch, FIG. 9B shows a diagram of a second notch, FIG. 9C shows a diagram of a third notch.

In an exemplary embodiment, the demolition structure can form discontinuous notch (as the notch of the external pollution-blocking structure 84 shown in FIG. 9A) or a sunken portion with a thinner thickness (as the sunken portion of the external pollution-blocking structure 86 shown in FIG. 9B). In this way, each part of the external pollution-blocking structure 84, 86 has enough connection force to prevent from separating during printing, and it is convenient to remove the external pollution-blocking structure 84, 86 after the printing is completed.

It should be noted that, as shown in FIG. 9C, if the colour 3D model being printed is an asymmetric model (for example, a conical model), a width of an upper part is different from that of a lower part of the generated colour 3D entity model 88, the user cannot separate the colour 3D entity model 88 and the external pollution-blocking entity model 90 by pushing. The present disclosure makes it easy for the user to demolish the external pollution-blocking entity model (for example, removing the external pollution-blocking entity model 90 along the notch) by providing the demolition structure on the external pollution-blocking structure, and the colour 3D entity model is not damaged.

Figure 11A:
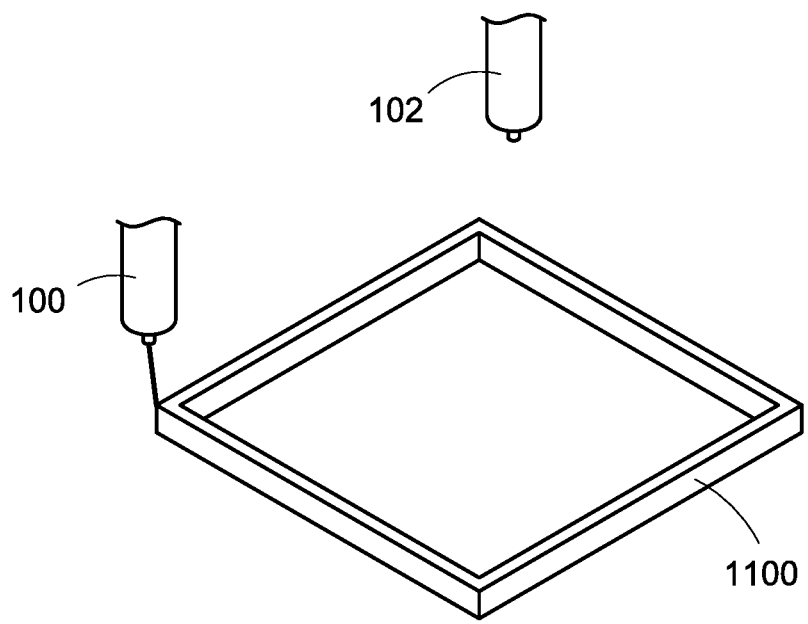
FIG. 11A shows a diagram of a first print according to the fourth exemplary embodiment of the present disclosure.
Figure 11B:
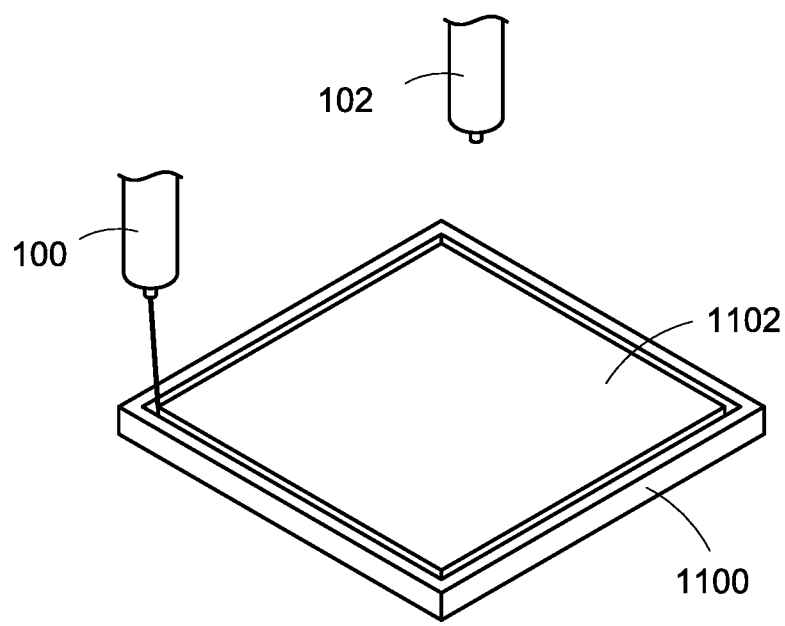
FIG. 11B shows a diagram of a second print according to the fourth exemplary embodiment of the present disclosure.
Figure 11C:
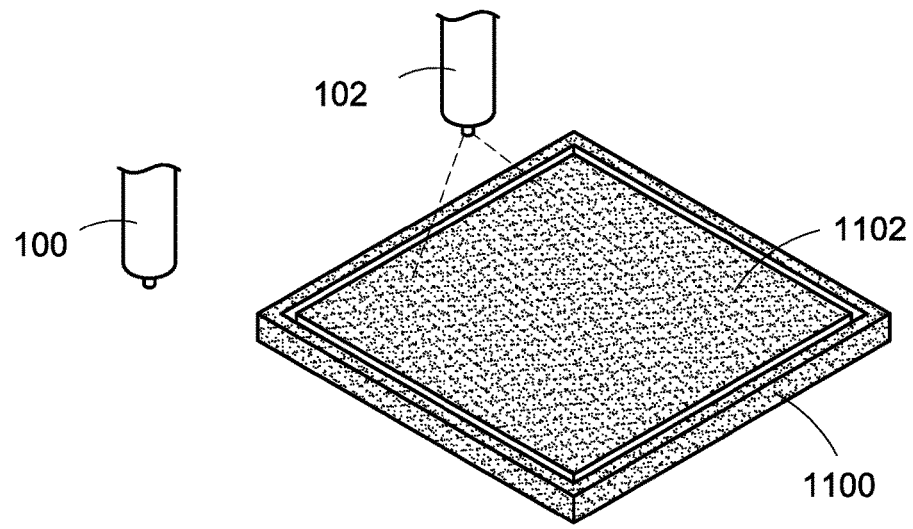
FIG. 11C shows a diagram of a third print according to the fourth exemplary embodiment of the present disclosure.
Figure 11D:
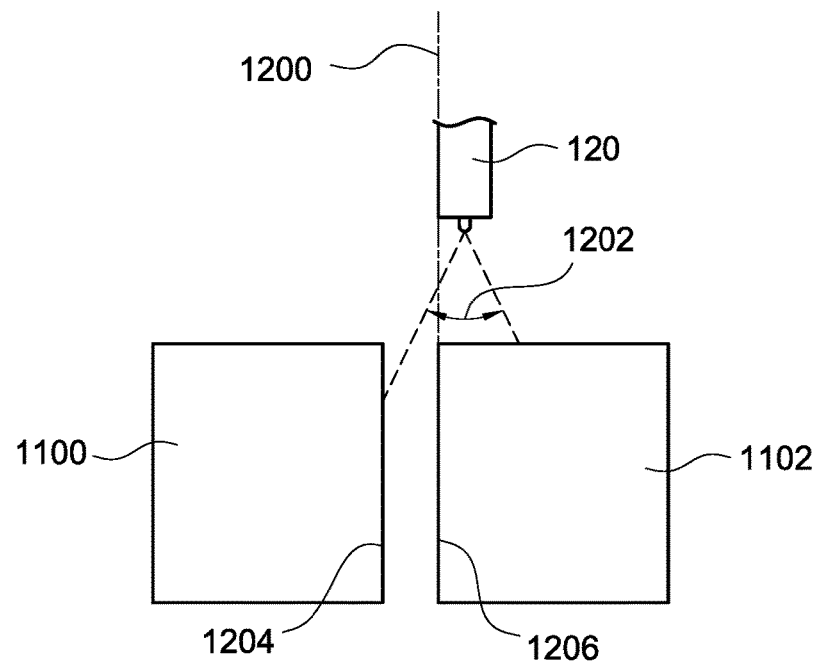
FIG. 11D shows a diagram of a fourth print according to the fourth exemplary embodiment of the present disclosure.
Figure 11E:
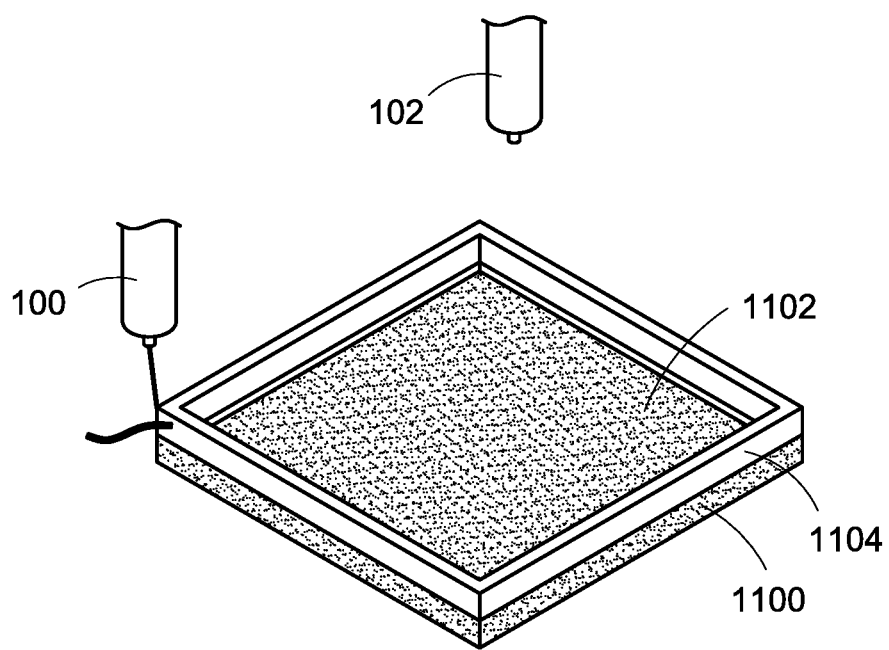
FIG. 11E shows a diagram of a fifth print according to the fourth exemplary embodiment of the present disclosure.

Please also refer to FIG. 10 and FIGS. 11A-11E, FIG. 10 shows a flowchart of part of the slicing and printing method according to the fourth exemplary embodiment of the present disclosure, FIG. 11A shows a diagram of a first print according to the fourth exemplary embodiment of the present disclosure, FIG. 11B shows a diagram of a second print according to the fourth exemplary embodiment of the present disclosure, FIG. 11C shows a diagram of a third print according to the fourth exemplary embodiment of the present disclosure, FIG. 11D shows a diagram of a fourth print according to the fourth exemplary embodiment of the present disclosure. Compared to the exemplary embodiment shown in FIG. 3, FIG. 11E shows a diagram of a fifth print according to the fourth exemplary embodiment of the present disclosure. The exemplary embodiment in FIG. 10 generates the pollution-blocking structure data corresponding to the external pollution-blocking structure. Compared to the exemplary embodiment shown in FIG. 3, in the exemplary embodiment of FIG. 10, the step S18 of the slicing and printing method includes the following steps.

Step S400: the control module 110 of the multi-colour 3D printer 1 controls the modeling nozzle 100 to print a layer of the external pollution-blocking slice 1100 (as shown in FIG. 11A) according to the pollution-blocking slice data of a layer.

Step S402: after printing a layer of the external pollution-blocking slice 1100 completely, the control module 110 controls the modeling nozzle 100 to execute a scrap retraction, to retract the scrap from printing the external pollution-blocking slice 1100 into the nozzle, this prevents overflow of the scrap of half-molten state, wherein the overflow would make the modeling nozzle 100 spit excessively during the next printing (the print model slice 1102 in step S404), and result in printing defect formed on the printed model slice 1102 and bad print quality.

Step S404: the control module 110 controls the modeling nozzle 100 to move and to print the model slice 1102 (as shown in FIG. 11B) of the same layer (that is, the model slice 1102 of the same height) according to the model slice data of the same layer (the same mark of layer number).

In an exemplary embodiment, after completely printing the model slice 1102, the control module 110 can control the modeling nozzle 100 to execute the scrap retraction again.

Step S406: the control module 110 determines if the printed model slice 1102 needs coloring.

In an exemplary embodiment, the control module 110 (according to the coloring data of the same layer) determines if the printed model slice 1102 needs coloring.

If the control module 110 determines that the coloring is needed, then step S408 is executed. Otherwise, the control module executes step S410.

Step S408: the control module 110 controls the coloring nozzle 102 to spout ink to the top cross-section of the printed model slice 1102 according to the coloring data of the same layer (as shown in FIG. 11C).

It should be noted that the ink splashing to a location outside the top cross-section would be blocked by the printed external pollution-blocking slice 1100 during the coloring, and the ink does not splash to the outer wall of other printed model slice.

As shown in example of FIG. 11D, during the coloring, the coloring nozzle 102 is limited to move in the print boundary 1200 (print boundary 1200 usually does not surpass an upside of the side-wall 1206 of the model slice 1102), without spouting outside of the top cross-section of the model slice 1102. That is, a center of the spouting range 1202 of the coloring nozzle 102 has to be located on the top cross-section of the model slice 1102.

The spouted ink only splashes from a location inside the print boundary 1200 to a location outside the print boundary 1200, instead of splashing from the location outside the print boundary 1200 to the location inside the print boundary 1200. Thus, the side-wall 1204 of the external pollution-blocking slice added by the present disclosure can adhere the ink splashing to a location outside the print boundary 1200, and can effectively prevent the splashing ink from dropping to the side-wall 1206 of the model slice 1102, this causes color pollution.

Step S410: the control module 110 determines if all of the model slice and the external pollution-blocking slice are printed completely, and all of the printed model slice are colored completely.

If the control module 110 determines the printing is completed, then the slicing and printing method is ended. Otherwise, steps S400 to S408 are executed again to continue to print the external pollution-blocking slice and the model slice of next layer in stack.

It should be noted that, because the modeling nozzle 100 keeps standing-by for a long time, the scrap of half-molten state will gradually overflow from the modeling nozzle 100 during the coloring. The above-mentioned condition makes the modeling nozzle 100 spit excessively during the next printing, and the printing defect is formed and the print quality is reduced.

Accordingly, after the coloring is completed, an exemplary embodiment of the present disclosure prints the external pollution-blocking slice first, and then prints the model slice, effectively making the defect only be generated on the printed external pollution-blocking slice (as shown in FIG. 11E, the defect of line shape is generated on the printed external pollution-blocking slice 1104), which will be discarded after printing is finished. Namely, the defect is not generated on the printed model slice, the print quality can be effectively improved.

Figure 12:
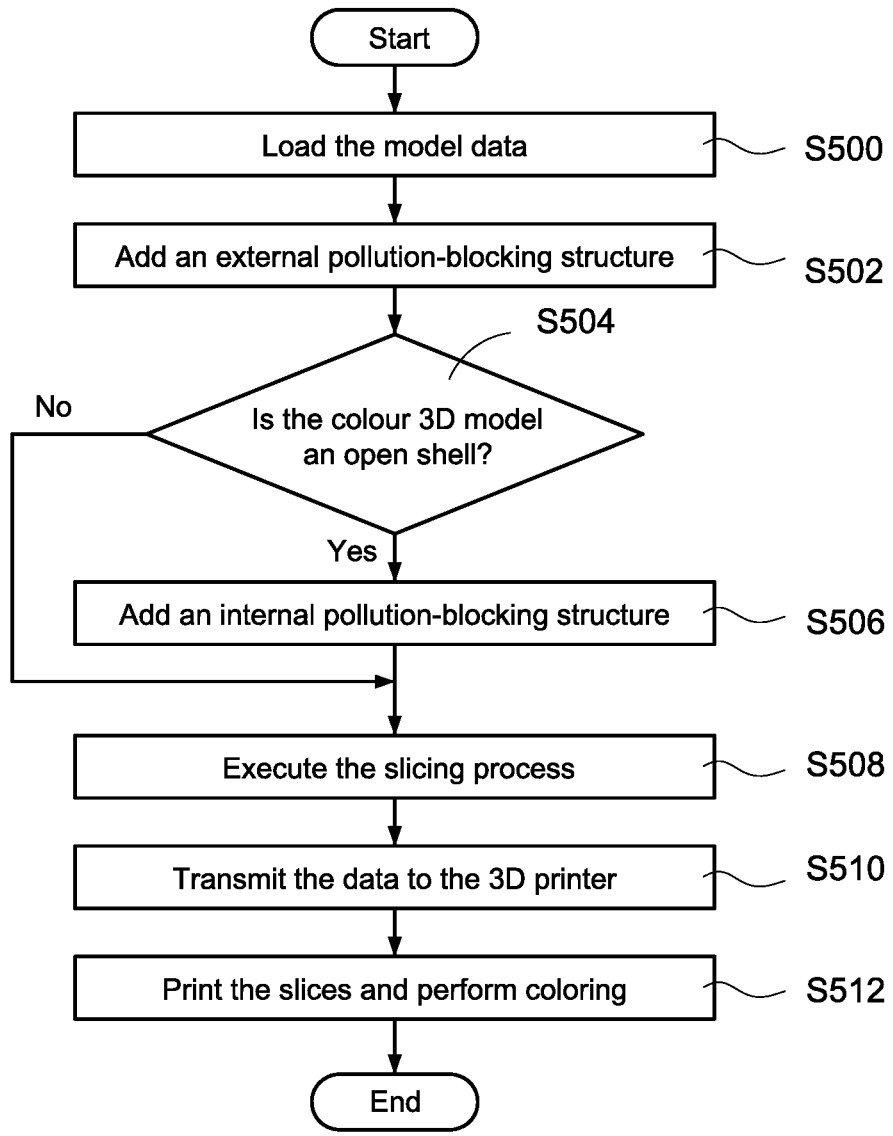
FIG. 12 shows a flowchart of the slicing and printing method according to the fifth exemplary embodiment of the present disclosure.
Figure 13C:
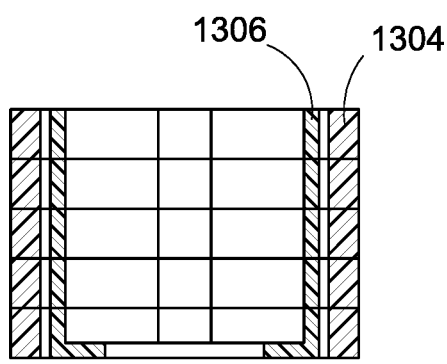
FIG. 13C shows a sectional view of a result of the slicing process of FIG. 13B.

Please also refer to FIG. 12 and FIGS. 13A-13C, FIG. 12 shows a flowchart of the slicing and printing method according to the fifth exemplary embodiment of the present disclosure, FIG. 13A shows a diagram of a third colour 3D model, FIG. 13B shows a diagram of an internal pollution-blocking structure added, FIG. 13C is a sectional view showing a result of the slicing process of FIG. 13B.

The slicing and printing method of the exemplary embodiment can further add an internal pollution-blocking structure if the slicing and printing method determines that the colour 3D model is an open shell. Steps S500, S502 of the exemplary embodiment is the same as or similar to steps S10, S12 shown in FIG. 3, detailed description is omitted here for brevity.

After the electronic device 2 executes the slicing software 20, the electronic device 2 can control the electronic device 2 to execute steps S500 and S502, and to execute step S504: the electronic device 2 determines if the colour 3D model (as the colour 3D model 1300 shown in FIG. 13A) corresponding to the loaded model data is an open shell (that is, the internal space communicates with the external space of the colour 3D model, and the colour, shape or structure thereof can be directly seen).

If the electronic device 2 determines the colour 3D model is an open shell, then the step S506 is executed. Otherwise, electronic device 2 ends the slicing and printing method of the exemplary embodiment, and performs the steps S14-S18 of the exemplary embodiment shown in FIG. 3 to conduct the slicing process and print process for the colour 3D model with the non-open shell.

Step S506: the electronic device 2 generates another pollution-blocking structure data corresponding to the internal pollution-blocking structure to add the internal pollution-blocking structure surrounded or partly surrounded by the inner wall of the loaded colour 3D model. In an exemplary embodiment, the internal pollution-blocking structure is close to but not in contact with the inner wall of the colour 3D model.

For example, as shown in FIG. 13B, the internal pollution-blocking structure 1302 corresponding to the pollution-blocking structure data is surrounded by the inner wall of the colour 3D model 1300, and thus the internal pollution-blocking structure 1302 is separated from the colour 3D model 1300 with a predetermined internal spacing (for example, 0.1 mm), wherein a thickness of the blocking wall part of the internal pollution-blocking structure 1302 matches the predetermined internal thickness (for example, 0.3 mm).

Step S508: the electronic device 2 executes the slicing process to generate the plurality of pollution-blocking slice data respectively corresponding to the plurality of pollution-blocking slices according to pollution-blocking structure data, to generate the plurality of model slice data respectively corresponding to the plurality of model slices according to shape data, and to generate the plurality of coloring data respectively corresponding to the plurality of model slice data according to the colour data.

The electronic device 2 executes the slicing process to the colour 3D model, external pollution-blocking structure and internal pollution-blocking structure (if the internal pollution-blocking structure exists) by the slicing process, to slice the external pollution-blocking to the plurality of external pollution-blocking slices, to slice the colour 3D model to the plurality of model slices (as the model slice 1304 shown in FIG. 13C), and to slice the internal pollution-blocking structure to the plurality of internal pollution-blocking slices (as the internal pollution-blocking slice 1306 shown in FIG. 13C). The electronic device 2 configures the colour of each model slice according to the colours of different parts of the colour 3D model.

In an exemplary embodiment, each pollution-blocking slice data, each model slice data and each coloring data respectively records a mark of layer number, the aforementioned mark of layer number is used to mark a number of layers correspond to each pollution-blocking slice data, each model slice data or each coloring data.

Step S510: the electronic device 2 transmits the generated 3D print data (all of the pollution-blocking slice data, and the model slice data and coloring data) to the multi-colour 3D printer 1.

Then the control module 110 of the multi-colour 3D printer 1 receives the 3D print data and executes step S512 by connection module 106. In step S512, the control module 110 controls the modeling nozzle 100 to print all of the external pollution-blocking slices and the internal pollution-blocking slices layer by layer according to all of the pollution-blocking slice data and the mark of layer number, to generate the external pollution-blocking entity model and the internal pollution-blocking entity model respectively, the control module 110 controls the modeling nozzle 100 to print all of the model slices layer by layer according to all of the model slice data and the mark of layer number, and controls the coloring nozzle 102 to perform coloring according to the coloring data and the mark of layer number to generate the colour 3D entity model.

Specifically, the control module 110 controls the coloring nozzle 102 to color the printed model slice according to the coloring data of the same layer during the printing, after the external pollution-blocking slice, model slice and internal pollution-blocking slice of the same layer are printed completely.

It should be noted that the printed external pollution-blocking slice surrounds and is close to the outer wall of the printed model slice, and the printed internal pollution-blocking slice surrounds and is close to the inner wall of the printed model slice, therefore, the ink splashing to a location outside the print range (the top cross-section of the printed model slice) is blocked by the printed external pollution-blocking slice and the printed internal pollution-blocking slice during the coloring, and the ink will not splash to the outer wall or inner wall of other printed model slice.

In this way, the present disclosure adds the internal pollution-blocking structure, thus the present disclosure can effectively prevent the ink from splashing to the inner wall of the printed other model slice (this causing color-mixing), and can effectively improve the print quality.

Figure 14:
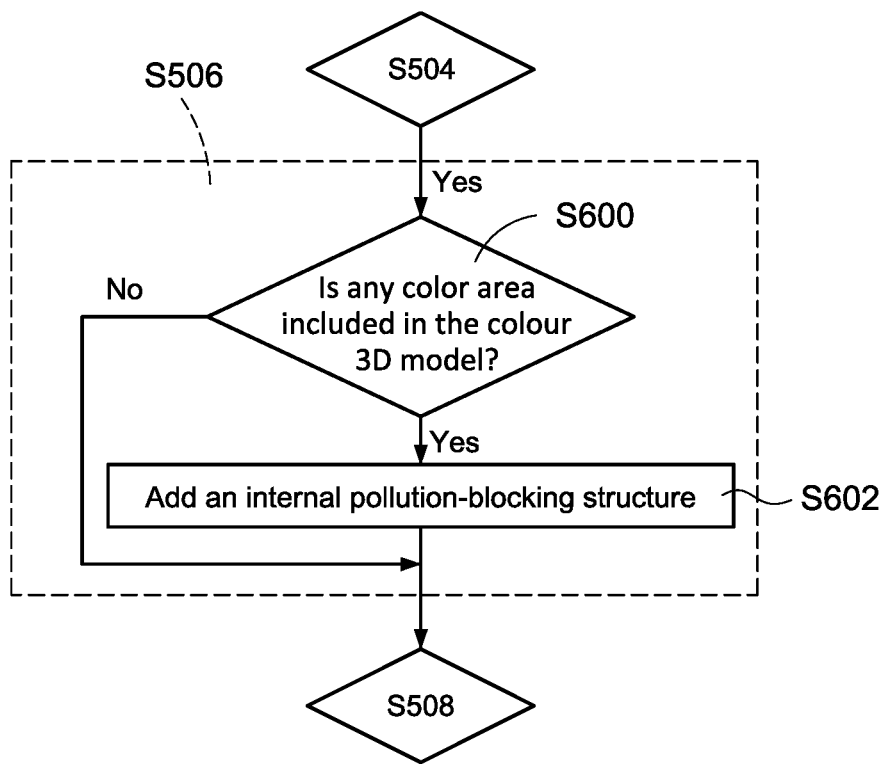
FIG. 14 shows a flowchart of part of the slicing and printing method according to the sixth exemplary embodiment of the present disclosure.
Figure 15:
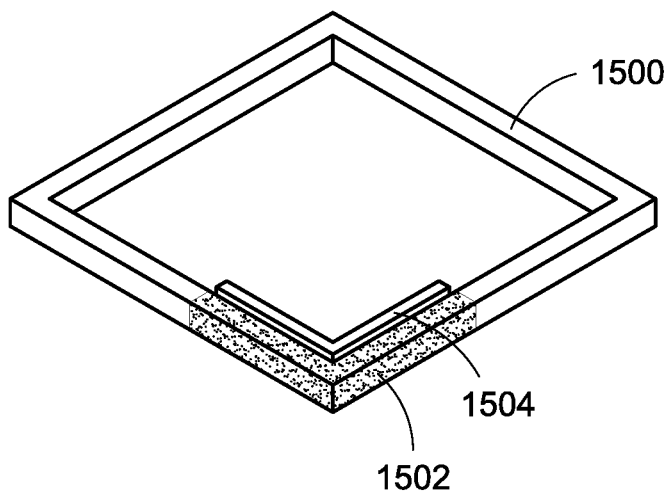
FIG. 15 shows a diagram of the internal pollution-blocking structure added in a single area.

Please also refer to FIG. 14 and FIG. 15, FIG. 14 shows a flowchart of part of the slicing and printing method according to the sixth exemplary embodiment of the present disclosure, FIG. 15 shows a diagram of the internal pollution-blocking structure added in a single area. Compared to the exemplary embodiment shown in FIG. 12, step S506 of the exemplary embodiment of the slicing and printing method includes the following steps.

Step S600: the electronic device 2 determines if the colour 3D model includes any color area.

If the electronic device 2 identifies any color area in the colour 3D model, then step S602 is executed to generate the pollution-blocking structure data to add an internal pollution-blocking structure. Otherwise, the electronic device 2 does not generate the pollution-blocking structure data and does not add the internal pollution-blocking structure and then step S508 is executed.

Further, if the electronic device 2 determines that the colour 3D model includes the color area, but the color area is located outside of the colour 3D model (that is, the ink will not be splashed to the inner wall when printing the colour 3D model), the electronic device 2 can determine that it is not needed to generate the pollution-blocking structure data to add the internal pollution-blocking structure, and then the step S508 is executed.

Step S602: the electronic device 2 generates the pollution-blocking structure data to add the internal pollution-blocking structure, and to make the internal pollution-blocking structure be surrounded by the inner wall of the recognized color area, in order to block the ink splashing toward the inner wall by the internal pollution-blocking structure during the coloring, and to avoid unexpected color-mixing or coloring.

For example, as shown in FIG. 15, if the colour 3D model 1500 includes the color area 1502, the electronic device 2 can add a set of the internal pollution-blocking structure 1504, and the internal pollution-blocking structure 1504 only surrounds the color area 1502, and partly surrounds the inner wall of the colour 3D model 1500. In this way, the ink splashing inward will be blocked by the internal pollution-blocking structure 1504 surrounding the inner wall color of the area 1502 when the multi-colour 3D printer 1 prints the color area 1502 and performs coloring.

Figure 16:
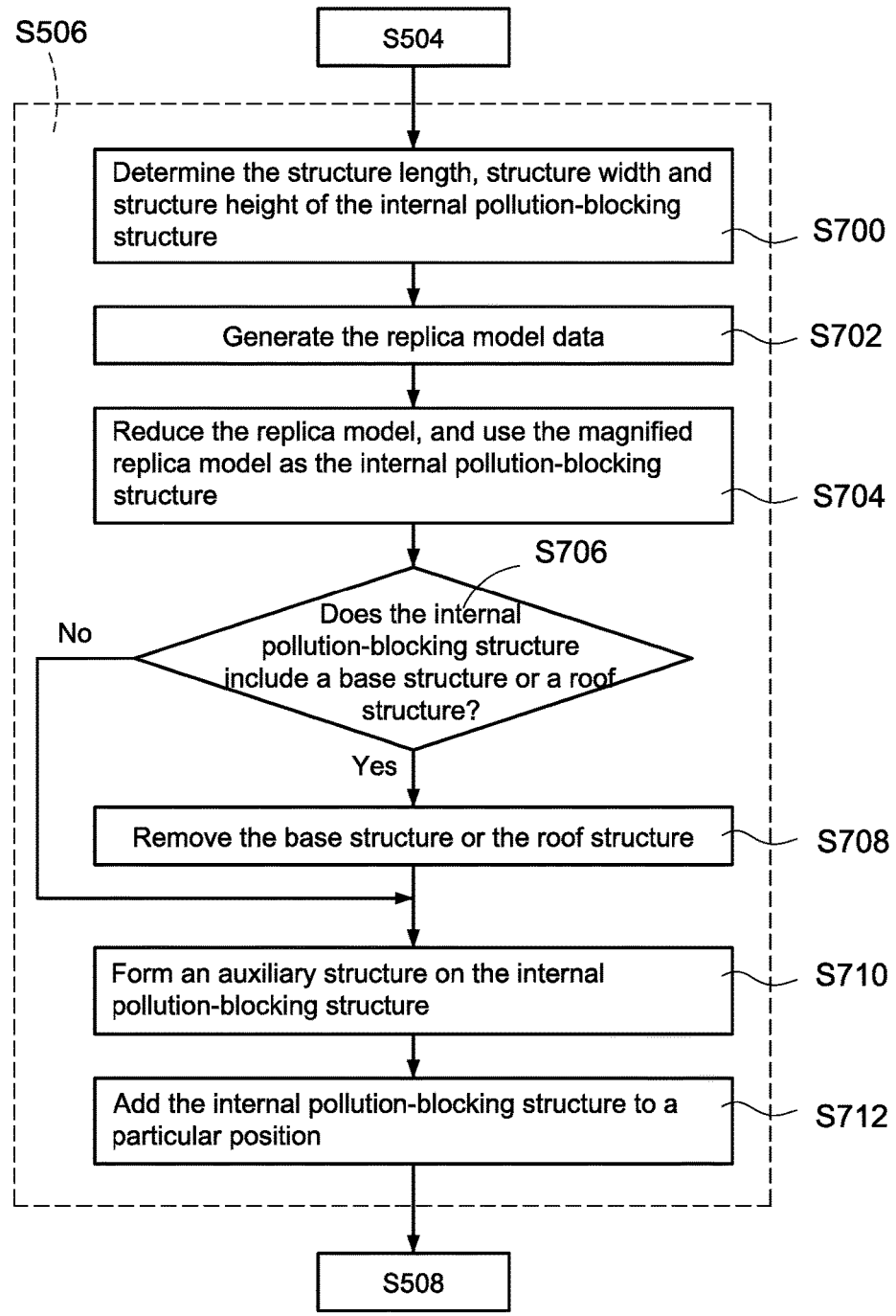
FIG. 16 shows a flowchart of part of the slicing and printing method according to the seventh exemplary embodiment of the present disclosure.
Figure 17A:
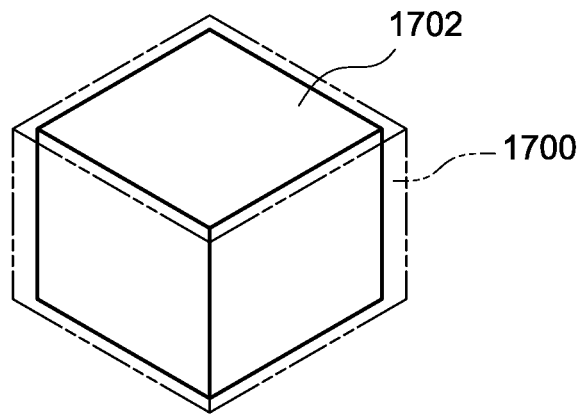
FIG. 17A shows a diagram of a fourth colour 3D model and the internal pollution-blocking structure reduced.
Figure 17B:
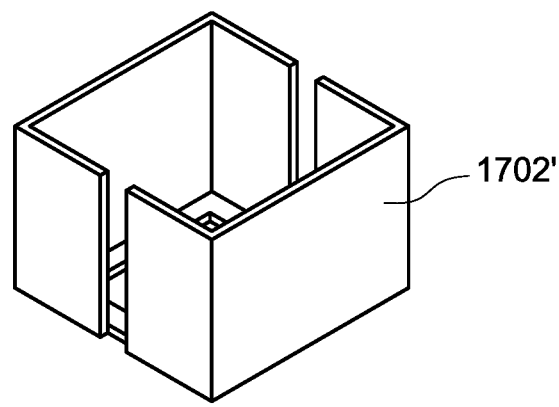
FIG. 17B shows a diagram of an internal pollution-blocking structure with a base structure and a roof structure removed, and with an auxiliary structure added.
Figure 18:
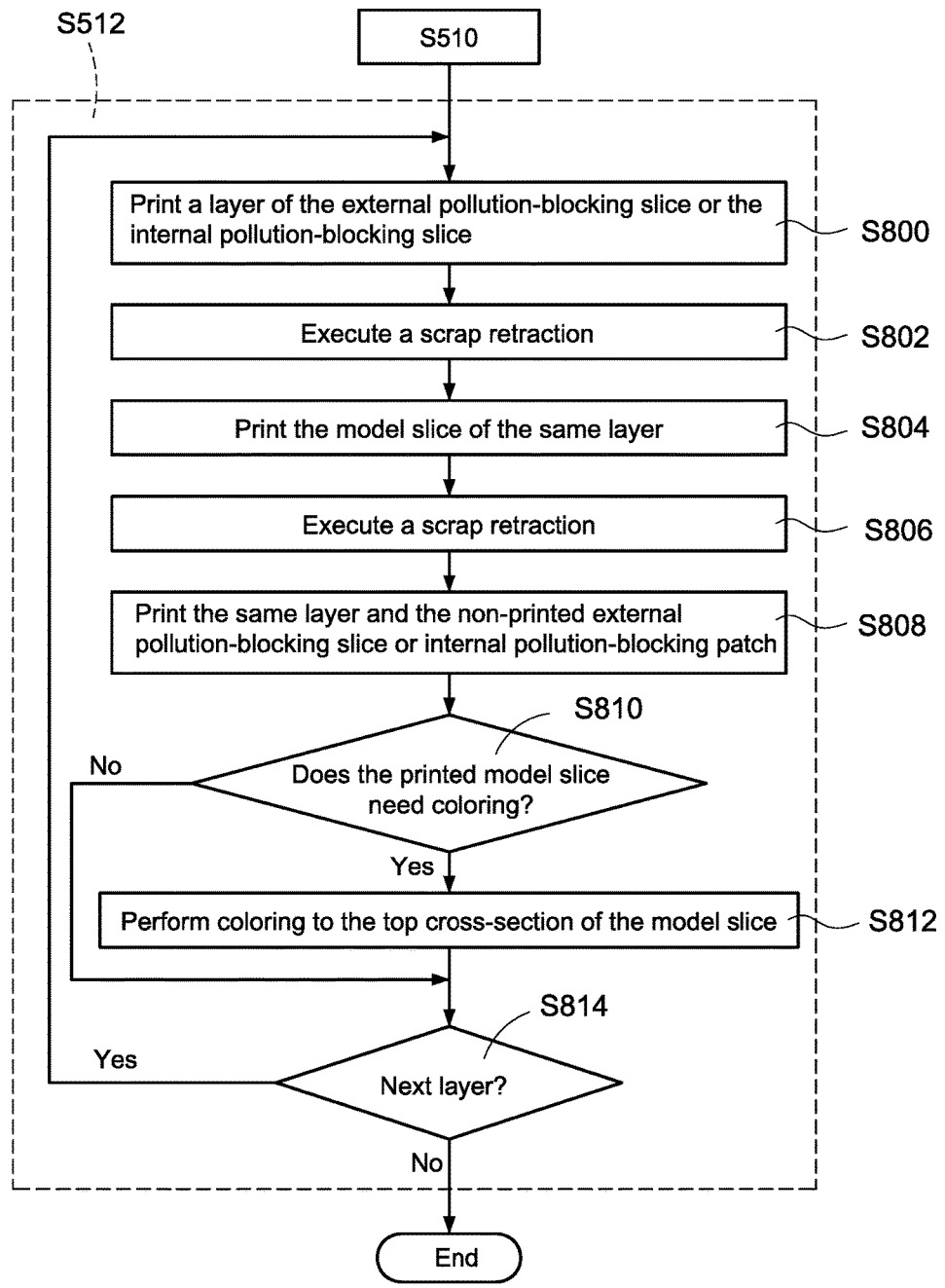
FIG. 18 shows a flowchart of part of the slicing and printing method according to the eighth exemplary embodiment of the present disclosure.

Please also refer to FIG. 16 and FIGS. 17A-17B, FIG. 16 shows a flowchart of part of the slicing and printing method according to the seventh exemplary embodiment of the present disclosure, FIG. 17A shows a diagram of a fourth colour 3D model and the internal pollution-blocking structure reduced, FIG. 17B shows a diagram of an internal pollution-blocking structure with a base structure removed and a roof structure removed, and with an auxiliary structure added. In the exemplary embodiment, the internal pollution-blocking structure is generated by modifying the replica model of the colour 3D model.

Compared to the fifth exemplary embodiment shown in FIG. 12, step S506 of the slicing and printing method of the exemplary embodiment includes the following steps.

Step S700: the electronic device 2 obtains a predetermined internal spacing and internal thickness. Then the electronic device 2 determines the structure length, structure width and structure height of the internal pollution-blocking structure to be generated according to the internal spacing, the internal thickness, the model length, model width, and model height of the shape data, and the base height respectively. The model length, model width, and model height of the aforementioned shape data and base height correspond to the model length, model width, model height and base height (if the base exists) of the colour 3D model (as the colour 3D model 1700 shown in FIG. 17A).

In an exemplary embodiment, the electronic device 2 calculates the structure length, structure width and structure height of the internal pollution-blocking structure according to the following equations (4)-(6):

structure length=(model length−internal spacing×2)　　(4)

structure width=(model width−internal spacing×2)　　(5)

structure height=model height−base height　　(6)

Step S702: the electronic device 2 generates the replica model data of the replica model corresponding to the colour 3D model. In an exemplary embodiment, both the shape and size of the replica model corresponding to the replica model data equal to the colour 3D model corresponding to the model data and are not to be colored.

Further, the electronic device 2 can execute the hollowing process to the replica model by modifying the replica model data, to make the internal replica model be hollow and the thickness of the blocking wall part matches the internal thickness, to reduce the print cost of the internal pollution-blocking structure. In other exemplary embodiment, the electronic device 2 also could skip the hollowing process.

Step S704: the electronic device 2 reduces the generated replica model by modifying the replica model data, to make the length, width and height of the replica model match the determined structure length, structure width and structure height (as the reduced replica model 1702 shown in FIG. 17A), and to use the reduced replica model as the internal pollution-blocking structure, that is, to use the modified replica model data as the aforementioned pollution-blocking structure data.

Step S706: the electronic device 2 determines if the internal pollution-blocking structure includes a base structure or a roof structure.

If the electronic device 2 determines that the internal pollution-blocking structure includes the base structure or the roof structure, then step S708 is executed. Otherwise, the electronic device 2 executes step S710.

Step S708: the electronic device 2 removes the base structure or roof structure of the internal pollution-blocking structure by modifying the pollution-blocking structure data, to make the internal pollution-blocking structure be an open shell.

Step S710: the electronic device 2 modifies the internal pollution-blocking structure by modifying the pollution-blocking structure data, to form an auxiliary structure (as the aforementioned demolition structure or support inner edge) on the internal pollution-blocking structure, namely to form structure as the internal pollution-blocking structure 1702' including a support inner edge and two adjacent notch shown in FIG. 17B.

In the present disclosure, a support inner edge is located on the internal pollution-blocking structure, additional support force can be provided to the internal pollution-blocking structure. The pollution-blocking function can keep working even when the internal pollution-blocking structure is collapsed or tilted during printing, to prevent the pollution-blocking structure from adhering to the colour 3D model during printing to ensure the successful printing.

The present disclosure makes it easy for the user to demolish the external pollution-blocking entity model by locating the demolition structure on the internal pollution-blocking structure, and the colour 3D entity model is not damaged.

Please refer to FIG. 16 again, the electronic device 2 then executes step S712: the electronic device 2 adds the internal pollution-blocking structure to a specific position (for example, the position surrounded by the inner wall of the colour 3D model and separated from the inner wall with the aforementioned internal spacing) of the colour 3D model by modifying the pollution-blocking structure data. Then step S508 is executed.

Figure 19A:
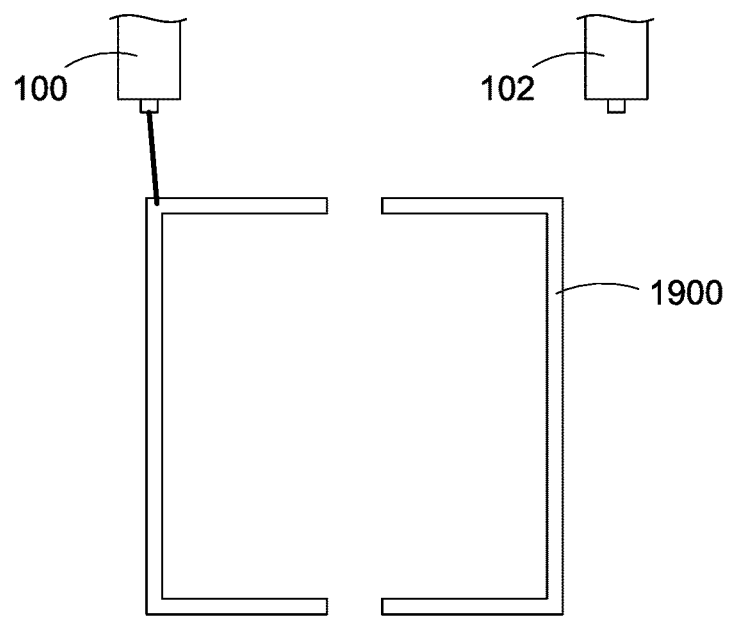
FIG. 19A shows a diagram of a first print according to the eighth exemplary embodiment of the present disclosure.
Figure 19B:
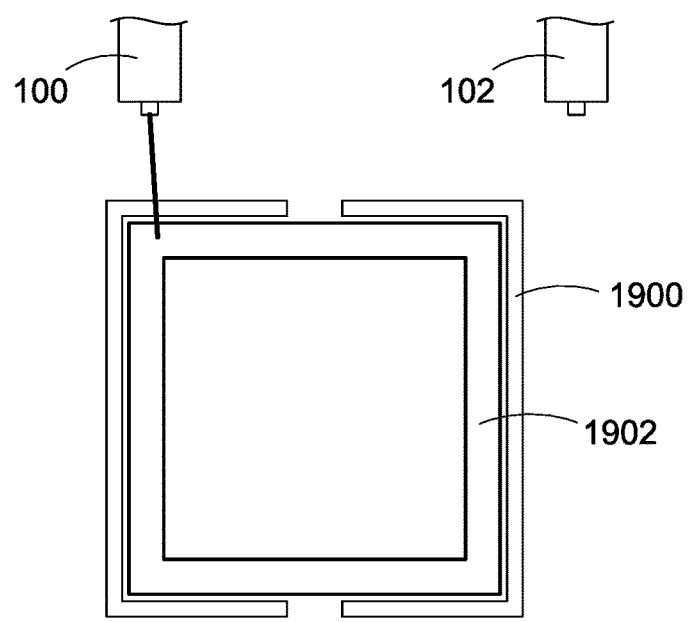
FIG. 19B shows a diagram of a second print according to the eighth exemplary embodiment of the present disclosure.
Figure 19C:
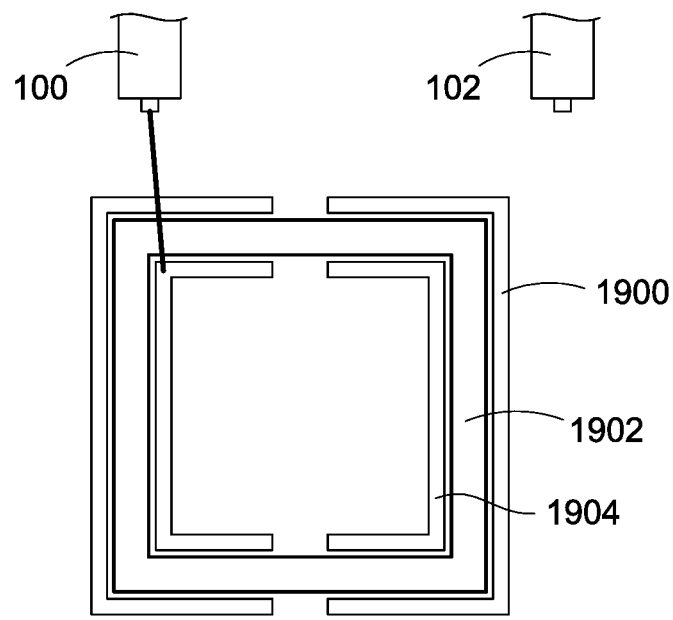
FIG. 19C shows a diagram of a third print according to the eighth exemplary embodiment of the present disclosure.
Figure 19D:
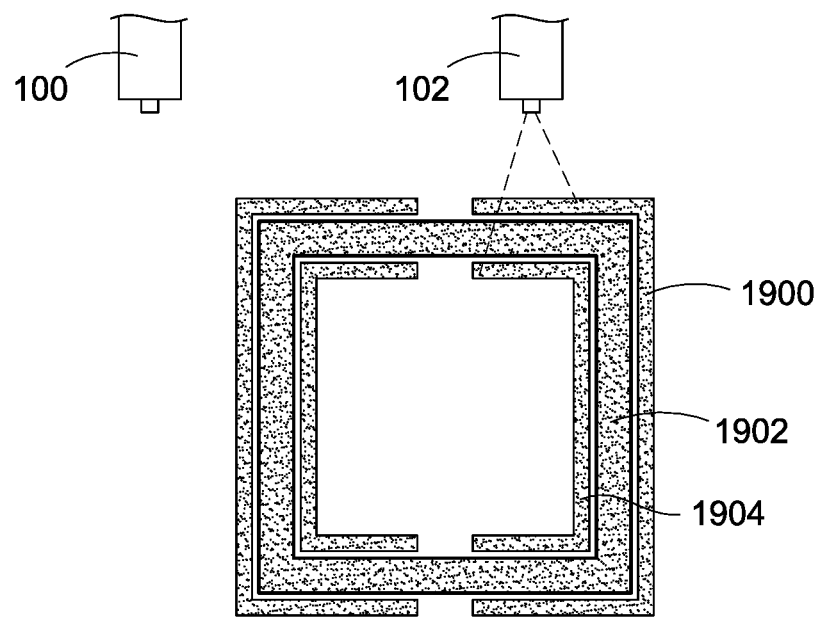
FIG. 19D shows a diagram of a fourth print according to the eighth exemplary embodiment of the present disclosure.

Please also refer to FIG. 18 and FIGS. 19A-19D, FIG. 18 shows a flowchart of part of the slicing and printing method according to the eighth exemplary embodiment of the present disclosure, FIG. 19A shows a diagram of a first print according to the eighth exemplary embodiment of the present disclosure, FIG. 19B shows a diagram of a second print according to the eighth exemplary embodiment of the present disclosure, FIG. 19C shows a diagram of a third print according to the eighth exemplary embodiment of the present disclosure, FIG. 19D shows a diagram of a fourth print according to the eighth exemplary embodiment of the present disclosure. Compared to the fifth exemplary embodiment shown in FIG. 12, step S512 of the slicing and printing method of the exemplary embodiment includes the following steps.

Step S800: the control module 110 of the multi-colour 3D printer 1 controls the modeling nozzle 100 to print a layer of external pollution-blocking slice or a layer of internal pollution-blocking patch (the example in FIG. 11A prints the external pollution-blocking slice 1900 first) according to the pollution-blocking slice data of a layer.

Step S802: after the above printing is completed, the control module 110 controls the modeling nozzle 100 to execute the scrap retraction.

Step S804: the control module 110 controls the modeling nozzle 100 to move and prints the same model slice 1902 (as shown in FIG. 19B) of the same layer (the same height of layer) according to the model slice data of the same layer (the same mark of layer number).

Step S806: after the above printing is completed, the control module 110 controls the modeling nozzle 100 to execute the scrap retraction.

Step S808: the control module 110 controls the modeling nozzle 100 to print the same layer and the non-printed external pollution-blocking slice or internal pollution-blocking patch (the example in FIG. 11C prints the internal pollution-blocking slice 1904).

For example, if the internal pollution-blocking slice is printed in step S800 first, then the external pollution-blocking slice is printed in step S808, vice versa.

Step S810: the control module 110 determines if the printed model slice 1902 needs to be colored according to the coloring data of the same layer.

If the control module 110 determines the coloring is needed, then step S812 is executed. Otherwise, the control module executes step S814. Step S812: the control module 110 controls the coloring nozzle 102 to spout ink to the top cross-section of the printed model slice 190 according to the coloring data of the same layer (as shown in FIG. 19D).

It should be noted that the ink splashing to a location outside the top cross-section is blocked by the printed external pollution-blocking slice 1900 and the printed internal pollution-blocking slice 1904, and the ink does not splash to outer wall or inner wall of the printed model slices printed.

Step S814: the control module 110 determines if all of the model slice, internal pollution-blocking slice and external pollution-blocking slice are printed completely, and all of the printed model slices are colored completely.

If the control module 110 determines that the printing is completed, then the slicing and printing method is ended. Otherwise, steps S800-S812 are executed again to continue to print next layer in stack.

Thus, particular exemplary embodiments have been described. Other exemplary embodiments are within the scope of the following claims. For example, the actions recited in the claims may be performed in a different order and still achieve desirable results.

What is claimed is:

1. A method of slicing and printing a colour 3D model, the method comprising:
   a) loading a model data corresponding to a colour 3D model and reading a shape data and a colour data of the model data;
   b) generating a pollution-blocking structure data corresponding to a pollution-blocking structure surrounding a color area of the colour 3D model or surrounded by the color area, and configuring the pollution-blocking structure data to make the pollution-blocking structure corresponding to the pollution-blocking structure data close to but not in contact with the colour 3D model;
   c) executing a slicing process to generate a plurality of pollution-blocking slice data corresponding to a plurality of pollution-blocking slices respectively according to the pollution-blocking structure data, to generate a plurality of model slice data corresponding to a plurality of model slices respectively according to the shape data, and to generate a plurality of coloring data according to the colour data, wherein each pollution-blocking slice data, each of the model slice data and each of the coloring data records a mark of layer number respectively; and
   d) controlling a modeling nozzle (100) of a multi-colour 3D printer (1) to print the plurality of pollution-blocking slices and the plurality of model slices layer by layer according to the plurality of pollution-blocking slice data and the plurality of model slice data, and controlling a coloring nozzle (102) of the multi-colour 3D printer (1) to color the model slice printed according to the coloring data with the same layer number when the pollution-blocking slices and the model slices with the same layer number are printed completely, wherein the pollution-blocking structure printed is close to but not in contact with the colour 3D model printed.

2. The method of slicing and printing a colour 3D model of claim 1, wherein the step b is to generate the pollution-blocking structure data corresponding to an external pollution-blocking structure and to configure the pollution-blocking structure data to make the external pollution-blocking structure surround an outer wall of the color area and separated from the outer wall of the color area with a spacing.

3. The method of slicing and printing a colour 3D model of claim 2, wherein the step b further comprises:
   b1) generating the pollution-blocking structure data corresponding to the external pollution-blocking structure;
   b2) forming a demolition structure or a support outer edge on the external pollution-blocking structure by modifying the pollution-blocking structure data; and
   b3) adding the external pollution-blocking structure to a position surrounding the outer wall of the color area by modifying the pollution-blocking structure data.

4. The method of slicing and printing a colour 3D model of claim 3, wherein the step b2 is to form a notch on the external pollution-blocking structure.

5. The method of slicing and printing a colour 3D model of claim 4, wherein the step b2 is to form the notch on a part not surrounding the color area of the external pollution-blocking structure.

6. The method of slicing and printing a colour 3D model of claim 2, wherein the step d comprises:
   d1) controlling the modeling nozzle (100) to print a layer of the pollution-blocking slice first, then print the model slice with the same layer number according to the pollution-blocking slice data and the model slice data with the same layer number;
   d2) controlling the coloring nozzle (102) to color a top cross-section of the model slice printed according to the coloring data with the same layer number; and
   d3) repeating executing the step d1 to the step d2 until all of the pollution-blocking slices and all of the model slices are printed completely and all of the model slices are colored completely.

7. The method of slicing and printing a colour 3D model of claim 6, wherein the step d1 controls the modeling nozzle (100) to execute a scrap retraction, then to print the model slice with the same layer number after printing the pollution-blocking slice.

8. The method of slicing and printing a colour 3D model of claim 2, wherein the step b comprises following steps:
   b4) generating the pollution-blocking structure data corresponding to the external pollution-blocking structure, wherein the external pollution-blocking structure is hollow and a thickness of a blocking wall part of the external pollution-blocking structure matches an external thickness; and b5) modifying the pollution-blocking structure data to add the external pollution-blocking structure to a position surrounding the outer wall of the color area and separated from the outer wall of the color area with an external spacing.

9. The method of slicing and printing a colour 3D model of claim 8, wherein the step b4 comprises:

b41) determining a structure length and a structure width according to the external spacing, the external thickness, and a model length and a model width of the shape data;

b42) determining a structure height according to a model height of the shape data;

b43) generating a replica model data of a replica model corresponding to the colour 3D model, and executing a hollowing process by modifying the replica model data, making a thickness of a blocking wall part of the replica model match the external thickness; and b44) magnifying the replica model by modifying the replica model data according to the structure length, the structure width and the structure height, and using the replica model data modified as the pollution-blocking structure data.

10. The method of slicing and printing a colour 3D model of claim 8, wherein the step b4 further comprises a step b45) removing a base structure or a roof structure by modifying the replica model data when the replica model corresponding to the replica model data comprises the base structure or the roof structure.

11. The method of slicing and printing a colour 3D model of claim 2, wherein further comprises a step e) generating another pollution-blocking structure data corresponding to an internal pollution-blocking structure, the internal pollution-blocking structure close to and surrounded by the color area, but not in contact with an inner wall of the color area, when the colour 3D model corresponding to the model data is an open shell.

12. The method of slicing and printing a colour 3D model of claim 1, wherein the step b is to generate the pollution-blocking structure data corresponding to an internal pollution-blocking structure and configuring the pollution-blocking structure data to make the pollution-blocking structure corresponding be surrounded by the color area and separated from an inner wall of the color area with a spacing.

13. The method of slicing and printing a colour 3D model of claim 12, wherein the step b comprises:

b6) generating the pollution-blocking structure data corresponding to the internal pollution-blocking structure;

b7) forming a demolition structure or a support inner edge on the internal pollution-blocking structure by modifying the pollution-blocking structure data; and b8) adding the internal pollution-blocking structure to a position surrounded by an inner wall of the color area by modifying the pollution-blocking structure data.

14. The method of slicing and printing a colour 3D model of claim 12, wherein the step d comprises:

d4) controlling the modeling nozzle (100) to print a layer of the pollution-blocking slice first, then printing the model slice with the same layer number according to the pollution-blocking slice data and the model slice data with the same layer number;

d5) controlling the coloring nozzle (102) to color a top cross-section of the model slice printed according to the coloring data with the same layer number; and d6) repeating executing the step d4 to the step d5 until all of the model slices and all of the pollution-blocking slices are printed completely and all of the model slices are colored completely.

15. The method of slicing and printing a colour 3D model of claim 12, wherein the step b comprises:

b8) generating the pollution-blocking structure data corresponding to the internal pollution-blocking structure; and b9) adding the internal pollution-blocking structure to a position surrounded by an inner wall of the color area and separated from the color area with an internal spacing by modifying the pollution-blocking structure data.

16. The method of slicing and printing a colour 3D model of claim 15, wherein the step b8 comprises:

b81) determining a structure length and a structure width according to the internal spacing, an internal thickness, and a model length and a model width of the shape data;

b82) determining a structure height according to a model height and a base height of the shape data;

b83) generating a replica model data of a replica model corresponding to the colour 3D model, and executing a hollowing process by modifying the replica model data for making a thickness of a blocking wall part of the replica model matches the internal thickness; and b84) reducing the replica model by modifying the replica model data according to the structure length, the structure width and the structure height, and using the replica model data modified as the pollution-blocking structure data.

17. The method of slicing and printing a colour 3D model of claim 16, wherein the step b8 further comprises a step b85) removing a base structure or a roof structure by modifying the replica model data when the replica model corresponding to the replica model data comprises the base structure or the roof structure.

* * * * *